US012571947B2

(12) United States Patent
Kim

(10) Patent No.: US 12,571,947 B2
(45) Date of Patent: Mar. 10, 2026

(54) LENS ASSEMBLY AND ELECTRONIC DEVICE INCLUDING THE SAME

(71) Applicant: Samsung Electronics Co., Ltd., Gyeonggi-do (KR)

(72) Inventor: Dongwoo Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 717 days.

(21) Appl. No.: 17/852,958

(22) Filed: Jun. 29, 2022

(65) Prior Publication Data

US 2023/0051248 A1 Feb. 16, 2023

Related U.S. Application Data

(63) Continuation of application No. PCT/KR2022/005669, filed on Apr. 20, 2022.

(30) Foreign Application Priority Data

Aug. 5, 2021 (KR) ........................ 10-2021-0102943

(51) Int. Cl.
*G02B 13/00* (2006.01)
*G02B 5/20* (2006.01)
(Continued)

(52) U.S. Cl.
CPC .............. *G02B 5/208* (2013.01); *G02B 9/16* (2013.01); *G02B 9/34* (2013.01); *G02B 13/0035* (2013.01); *G02B 13/004* (2013.01)

(58) Field of Classification Search
CPC . G02B 5/208; G02B 9/16; G02B 9/34; G02B 13/0035; G02B 13/004; G02B 9/12;
(Continued)

(56) References Cited

U.S. PATENT DOCUMENTS

2004/0223068 A1 11/2004 Kamo
2006/0262416 A1* 11/2006 Lee .......................... G02B 9/06
359/645
(Continued)

FOREIGN PATENT DOCUMENTS

CN 208156288 U 11/2018
JP 2007-121820 A 5/2007
(Continued)

OTHER PUBLICATIONS

Gross "Handbook of Optical Systems, vol. 3, Aberrations Theory of Optical Systems" Excerpt from article (Year: 2007).*
(Continued)

*Primary Examiner* — Bumsuk Won
*Assistant Examiner* — John Curtis Sipes
(74) *Attorney, Agent, or Firm* — Sughrue Mion, PLLC

(57) ABSTRACT

According to certain embodiments of the disclosure, a lens assembly and/or an electronic device including the same may comprise an image sensor, three or four lenses sequentially arranged along an optical axis from an object side to an image sensor side, and a coating layer provided on an object-side surface or an image sensor-side surface of at least one of the lenses and configured to at least partially block light in a wavelength band of 800 nm to 1000 nm. The lens assembly may meet Equation 1 and Equation 2.

$$0.001 \leq \frac{BFL}{HFoV} \leq 0.02 \qquad \text{[Equation 1]}$$

$$1.3 \leq \frac{OAL}{IH} \leq 1.6 \qquad \text{[Equation 2]}$$

Other various embodiments are possible as well.

15 Claims, 12 Drawing Sheets

(51) Int. Cl.
  G02B 9/16 (2006.01)
  G02B 9/34 (2006.01)
(58) Field of Classification Search
  CPC ........ G02B 5/281; G02B 1/10; G02B 3/0087;
                G02B 3/04; G02B 5/20; G02B
                2003/0093; G02B 13/00; G03B 30/00;
                G03B 3/00; H04M 1/0264; H04M 1/02
  See application file for complete search history.

(56) References Cited

U.S. PATENT DOCUMENTS

| | | | |
|---|---|---|---|
| 2008/0165430 A1 | 7/2008 | Bareau et al. | |
| 2008/0268899 A1 | 10/2008 | Lee | |
| 2009/0046380 A1 | 2/2009 | Tang | |
| 2010/0321795 A1 | 12/2010 | Shyu et al. | |
| 2012/0002303 A1* | 1/2012 | Shih ................... | G02B 13/0035 |
| | | | 359/716 |
| 2012/0261550 A1 | 10/2012 | Chou et al. | |
| 2015/0055226 A1* | 2/2015 | Ohtani ................... | H04N 23/57 |
| | | | 359/683 |
| 2016/0109685 A1 | 4/2016 | Huang et al. | |
| 2016/0154207 A1 | 6/2016 | Son | |
| 2017/0329102 A1 | 11/2017 | Yuza et al. | |
| 2021/0048616 A1 | 2/2021 | Bian et al. | |
| 2021/0310941 A1* | 10/2021 | Sandsten ............... | G01J 5/0806 |
| 2021/0352215 A1* | 11/2021 | Kim ......................... | G02B 7/04 |
| 2021/0356717 A1* | 11/2021 | Hirano ................... | G02B 13/18 |
| 2022/0236534 A1* | 7/2022 | Liu ..................... | G02B 15/1461 |

FOREIGN PATENT DOCUMENTS

| | | |
|---|---|---|
| JP | 2010-526320 A | 7/2010 |
| JP | 2016-538605 A | 12/2016 |
| JP | 2021-33286 A | 3/2021 |
| KR | 10-2007-0117026 A | 12/2007 |
| KR | 10-2008-0112716 A | 12/2008 |
| KR | 10-0906842 B1 | 7/2009 |
| KR | 10-1328950 B1 | 11/2013 |
| KR | 10-2016-0064591 A | 6/2016 |

OTHER PUBLICATIONS

Examiner provided machine translation of KR20080112716A (Year: 2008).*

International Search Report dated Jul. 14, 2022.

* cited by examiner

LENS ASSEMBLY AND ELECTRONIC DEVICE INCLUDING THE SAME

CROSS-REFERENCE TO RELATED APPLICATION(S)

This application is a continuation of, based on and claims priority under 35 U.S.C. § 120 to PCT International Application No. PCT/KR2022/005669, which was filed on Apr. 20, 2022, and claims priority to Korean Patent Application No. 10-2021-0102943, filed on Aug. 5, 2021, in the Korean Intellectual Property Office, the disclosure of which are incorporated by reference herein their entirety.

BACKGROUND

Technical Field

One or more embodiments of the instant disclosure generally relate to a lens assembly, e.g., a lens assembly that includes a plurality of lenses and an electronic device including the same.

Description of Related Art

Lens assemblies, for example, implemented in cameras capable of capturing images or videos have been widely used, and digital cameras or video cameras with solid-state image sensors such as charge coupled device (CCD) or complementary metal-oxide semiconductor (CMOS) have recently become commonplace. Lens assemblies working with solid-state image sensors (CCD or CMOS) may easily save, copy, or transmit images as compared with film-type lens assemblies and have thus been replacing film-type lens assemblies.

Recently, a plurality of lens assemblies, e.g., two or more lens assemblies such as for macro camera, telephoto camera, or wide-angle camera, are built in one electronic device to enhance image quality. For example, it is possible to obtain images of an object with multiple cameras having different optical properties and synthesize the images to obtain a high-quality image. When equipped with a plurality of lens assemblies (e.g., cameras) to obtain high-quality images, electronic devices, such as mobile communication terminals or smartphones, are gradually replacing dedicated capturing devices, such as digital cameras.

The above-described information may be provided as background for the purpose of helping understanding of the disclosure. No claim or determination is made as to whether any of the foregoing is applicable as background art in relation to the disclosure.

SUMMARY

As use of personal portable electronic devices, such as laptop computers, tablet PCs, or smartphones has become commonplace, users' demand is increasing for portability (e.g. compactness) and performance. Lens assemblies have been used mainly to obtain images of various objects but, to provide additional performance or functions required for the electronic device, they are able to perform such functions as object recognition, augmented reality, and/or 3D scanning. As mentioned above, when equipped with a plurality of lens assemblies, the electronic device may have better optical performance and may be able to provide additional functionality. On the other hand, however, users' demand for portability is also increasing, rendering it difficult to implement multiple lens assemblies in the electronic device.

According to an embodiment of the disclosure, a lens assembly and/or an electronic device including the same may comprise an image sensor, three or four lenses sequentially arranged along an optical axis from an object side to an image sensor side, and a coating layer provided on an object-side surface or an image sensor-side surface of at least one of the lenses and configured to at least partially block light in a wavelength band of 800 nm to 1000 nm. The lens assembly may meet Equation 1 and Equation 2.

$$0.001 \le \frac{BFL}{HFoV} \le 0.02 \qquad \text{[Equation 1]}$$

$$1.3 \le \frac{OAL}{IH} \le 1.6 \qquad \text{[Equation 2]}$$

Here, 'back focal length (BFL)' may be a distance from an image sensor-side surface of an image sensor-side first lens to an image plane of the image sensor along the optical axis, 'half field of view (HFoV)' may be a half field of view of the lens assembly, 'overall length (OAL)' may be a distance from an object-side surface of an object-side first lens to the image plane of the image sensor along the optical axis, and 'image height (IH)' may be an image height of the image sensor from the optical axis.

According to an embodiment of the disclosure, a lens assembly and/or an electronic device including the same may comprise an image sensor, three or four lenses sequentially arranged along an optical axis from an object side to an image sensor side, and a coating layer formed on an object-side surface of an image sensor-side first lens and configured to at least partially block light in a wavelength band of 800 nm to 1000 nm. The object-side surface and/or an image sensor-side surface of the image sensor-side first lens may include an infection point. The lens assembly may meet Equation 4 and Equation 5.

$$0.001 \le \frac{BFL}{HFoV} \le 0.02 \qquad \text{[Equation 4]}$$

$$1.3 \le \frac{OAL}{IH} \le 1.6 \qquad \text{[Equation 5]}$$

Here, 'BFL' may be a distance from the image sensor-side surface of the image sensor-side first lens to an image plane of the image sensor along the optical axis, 'HFoV' may be a half field of view of the lens assembly, 'OAL' may be a distance from an object-side surface of an object-side first lens to the image plane of the image sensor along the optical axis, and 'IH' may be an image height of the image sensor from the optical axis.

According to an embodiment of the disclosure, an electronic device may comprise a housing, a display exposed through one surface of the housing, a lens assembly received in the housing and configured to at least partially receive or detect light transmitted through the housing, according to any one of embodiments described below, a communication module, and a processor. The processor may be configured to obtain a first image based on the light received or detected by the lens assembly, control the communication module to transmit the first image to an external device in a communication session with the external device, and control the display to display a second image received from the external device through the communication module in the communication session with the external device.

Additional aspects will be set forth in part in the description which follows and, in part, will be apparent from the description, or may be learned by practice of the presented embodiments.

BRIEF DESCRIPTION OF THE DRAWINGS

The foregoing and other aspects, configurations, and/or advantages of various embodiments of the disclosure will be more apparent from the following detailed description taken in conjunction with the accompanying drawings.

Throughout the drawings, like reference numerals may be assigned to like parts, components, and/or structures.

DETAILED DESCRIPTION

Certain embodiments of the disclosure aim to address the foregoing issues and/or drawbacks and provide advantages described below, providing a miniaturized lens assembly with good optical performance and/or an electronic device including the same. For example, there may be provided a miniaturized lens assembly that provides a field of view of about 80 degrees to about 95 degrees and/or an electronic device including the same.

Certain embodiments of the disclosure may provide a lens assembly that may contribute to enhancement of the optical performance of an electronic device or increase of functionalities of the electronic device.

According to certain embodiments of the disclosure, the lens assembly and/or the electronic device may not have an infrared blocking filter but instead including an infrared blocking coating layer provided to at least one of three or four lenses. For example, since no infrared blocking filter is required, miniaturization can be obtained and, as the infrared blocking function is implemented by the coating layer provided on one or more lenses, it is possible to obtain good image quality. In another embodiment, because the lens assembly is miniaturized, more lens assemblies can be disposed in the electronic device. And as the electronic device includes more lens assemblies, the electronic device may have enhanced optical performance or provide the user with increased functionality. Other various effects may be provided directly or indirectly in the disclosure.

The following description taken in conjunction with the accompanying drawings may be presented to provide a comprehensive understanding of various implementations of the disclosure as defined by the claims and equivalents thereto. The specific embodiments disclosed in the following description entail various specific details to aid understanding, but are regarded as one of various embodiments. Accordingly, it will be apparent to those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe the various embodiments of the disclosure. Therefore, it will be apparent to those skilled in the art that the following description of various implementations of the disclosure is provided only for the purpose of description, not for the purpose of limiting the disclosure defined as the scope of the claims and equivalent thereto.

The singular forms "a," "an," and "the" are intended to include the plural forms as well, unless the context clearly indicates otherwise. Thus, as an example, "a component surface" may be interpreted as including one or more of the surfaces of a component.

Figure 1:
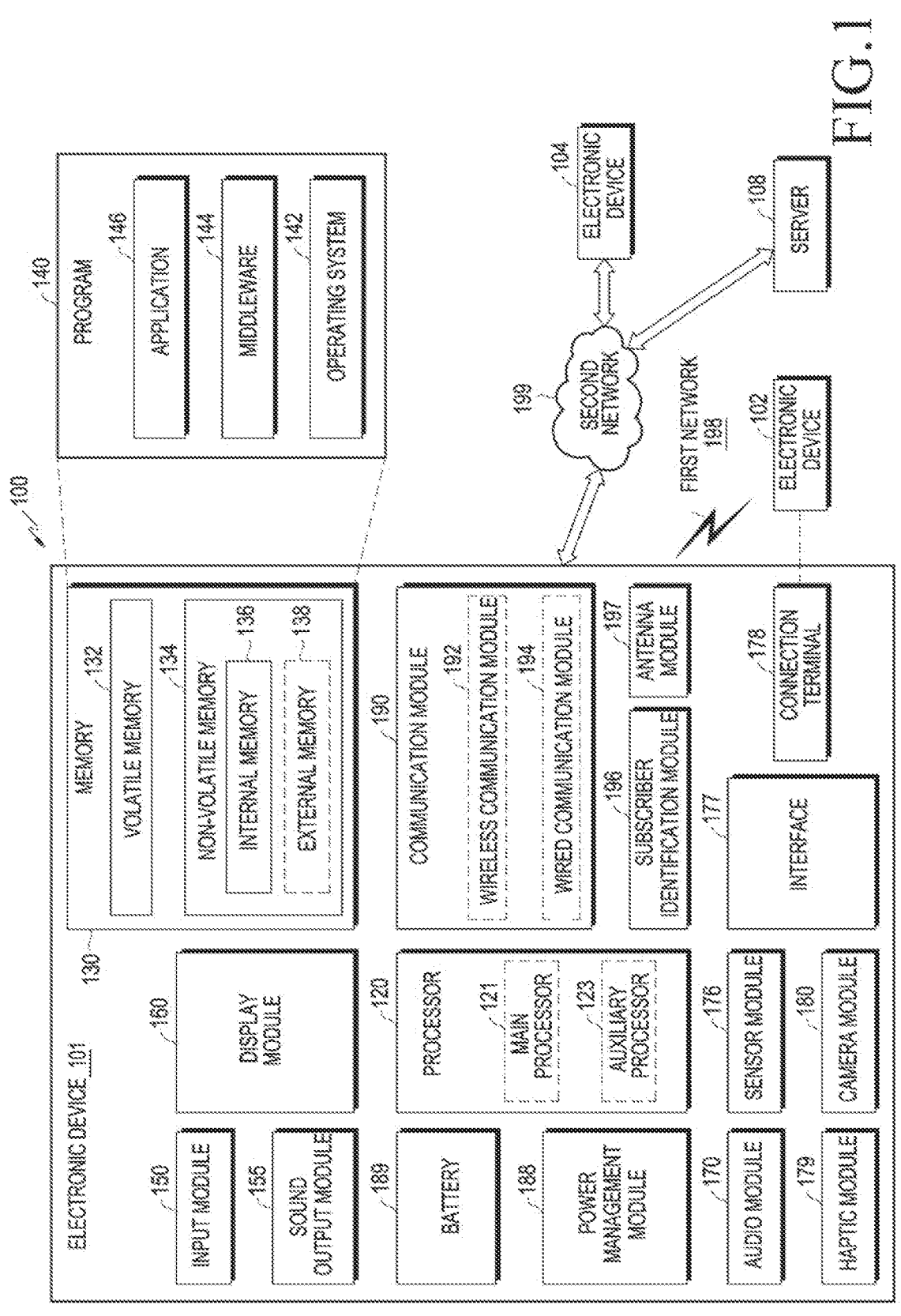
FIG. 1 is a view illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beamforming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to certain embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
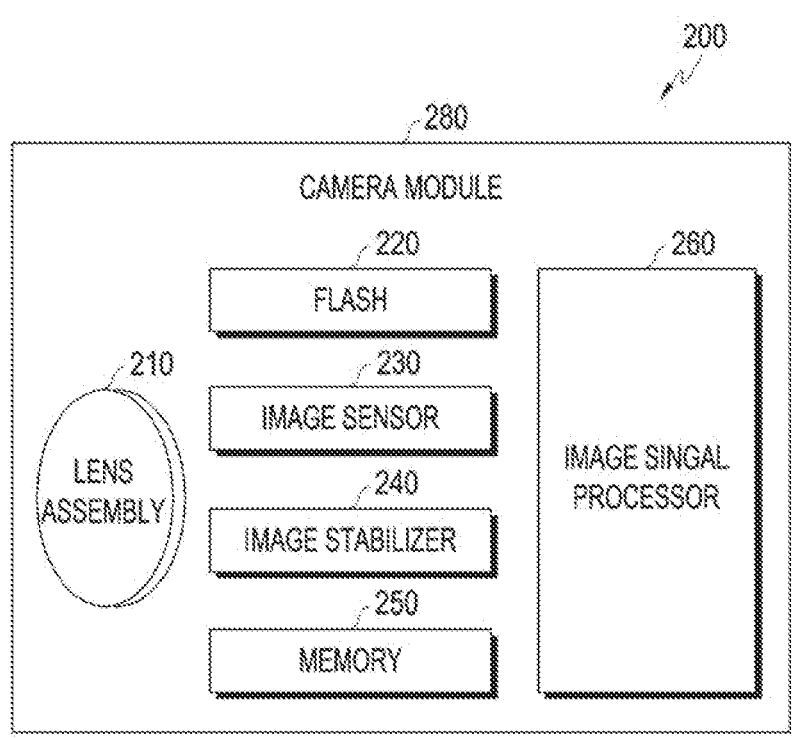
FIG. 2 is a block diagram illustrating a camera module according to an embodiment.

FIG. 2 is a block diagram 200 illustrating the camera module 280 (e.g., the camera module 180 of FIG. 1) according to an embodiment. Referring to FIG. 2, the camera module 280 may include a lens assembly 210, a flash 220, an image sensor 230, an image stabilizer 240, memory 250 (e.g., buffer memory), or an image signal processor 260. In some embodiments, the lens assembly 210 may include the image sensor 230. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., field of view, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 280 or the electronic device 201 including the camera module 180. This allows compensating for at least part of a negative effect (e.g., image blurring) by the movement on an image being captured. According to an embodiment, the image stabilizer 240 may sense such a movement by the camera module 280 or the electronic device (e.g., the electronic device 101 of FIG. 1) using a gyro sensor (not shown) or an acceleration sensor (not shown) disposed inside or outside the camera module 280. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160 of FIG. 1. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory (e.g., the memory 130 of FIG. 1) or as a separate memory that is operated independently from the memory.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 130, the display module 160, the electronic device 102, the electronic device 104, or the server 108 of FIG. 1) outside the camera module 280. According to an embodiment, the image signal processor 260 may be configured as at least part of the processor (e.g., the processor 120 of FIG. 1), or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device (e.g., the electronic device 101 of FIG. 1) may include a plurality of camera modules 280 having different attributes or functions. In such a case, at least one of the plurality of camera modules 280 may form, for example, a wide-angle camera and at least another of the plurality of camera modules 180 may form a telephoto camera. Similarly, at least one of the plurality of camera modules 280 may form, for example, a front camera and at least another of the plurality of camera modules 180 may form a rear camera.

Figure 3:
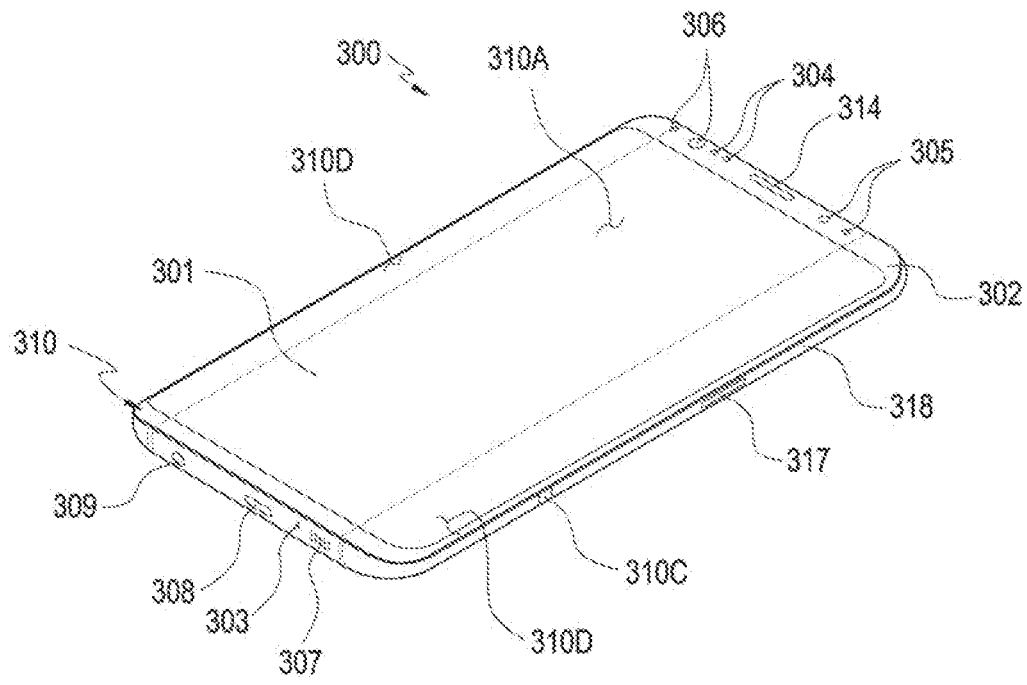
FIG. 3 is a front perspective view illustrating an electronic device according to an embodiment.
Figure 4:
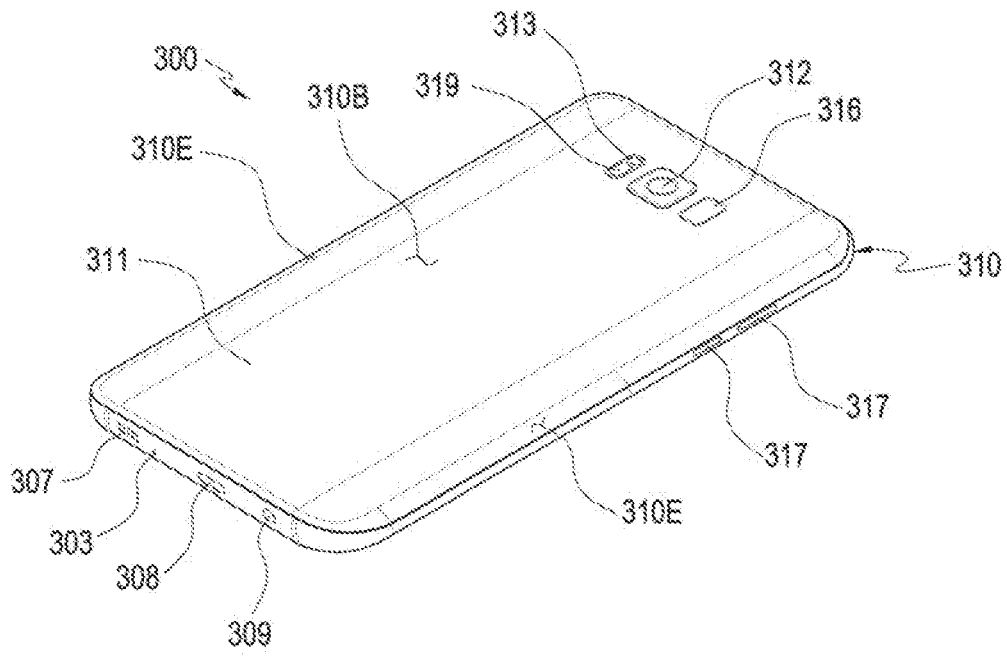
FIG. 4 is a rear perspective view illustrating the electronic device of FIG. 3.

FIG. 3 is a front perspective view illustrating an electronic device 300 (e.g., the electronic device 101 of FIG. 1) according to an embodiment. FIG. 4 is a rear perspective view illustrating the electronic device 300 as illustrated in FIG. 3.

Referring to FIGS. 3 and 4, according to an embodiment, an electronic device 300 (e.g., the electronic device 101 of FIG. 1) may include a housing 310 including a first surface (or front surface) 310A, a second surface (or rear surface) 310B, and a side surface 310C surrounding a space between the first surface 310A and the second surface 310B. According to another embodiment (not shown), the housing 310 may be the structure that includes at least parts of the first surface 310A, the second surface 310B, and the side surface 310C of FIG. 3. According to an embodiment, the first surface 310A may be formed by a front plate 302 (e.g., glass plate or polymer plate with various coat layers) at least part of which is substantially transparent. According to another embodiment, the front plate 302 may be coupled with the housing 310 and, along with the housing 310, may form an internal space. According to certain embodiments, the "internal space" may refer to the space within the housing 310 for receiving at least part of the display module 160 of FIG. 1 or the display 301 described below.

According to an embodiment, the second surface 310B may be made of a substantially opaque rear plate 311. The rear plate 311 may be formed of, e.g., laminated or colored glass, ceramic, polymer, metal (e.g., aluminum, stainless steel (STS), or magnesium), or a combination of at least two thereof. The side surface 310C may be implemented by a side bezel structure (or a "side member") 318 that couples to the front plate 302 and the rear plate 311 and includes metal and/or polymer. According to another embodiment, the rear plate 311 and the side bezel structure 318 may be integrated together and may be implemented with the same material (e.g., metal such as aluminum).

In the embodiment illustrated, the front plate 302 may include two first areas 310D, which seamlessly and bendingly extend from the first surface 310A to the rear plate 311, on the two longitudinal edges of the front plate 302. In the embodiment (refer to FIG. 4) illustrated, the rear plate 311 may include two second areas 310E, which seamlessly and bendingly extend from the second surface 310B to the front plate, on the two longitudinal edges. According to other embodiments, the front plate 302 (or the rear plate 311) may include only one of the first areas 310D (or the second areas 310E). According to another embodiment, the first areas 310D or the second areas 301E may partially be excluded. In the above-described embodiments, at the side view of the electronic device 300, the side bezel structure 318 may have a first thickness (or width) for sides (e.g., the side where the connector hole 308 is formed) that do not have the first areas 310D or the second areas 310E and a second thickness, which is smaller than the first thickness, for sides (e.g., the side where the key input device 317 is disposed) that have the first areas 310D or the second areas 310E.

According to an embodiment, the electronic device 300 may include at least one or more of the display 301, audio modules 303, 307, and 314, sensor modules 304, 316, and 319, camera modules 305, 312, and 313 (e.g., the camera module 180 or 280 of FIG. 1 or FIG. 2), key input devices 317 (e.g., the input module 150 of FIG. 1), the light emitting device 306, and connector holes 308 and 309. According to other embodiments, the electronic device 300 may exclude at least one of the components (e.g., the key input device 317 or the light emitting device 306) or may add other components.

The display 301 (e.g., the display module 160 of FIG. 1) may be exposed through a significant portion of the front plate 302. According to an embodiment, at least a portion of the display 301 may be exposed through the front plate 302 forming the first surface 310A and the first areas 310D of the side surface 310C. According to an embodiment, the edge of the display 301 may be formed to be substantially the same in shape as the adjacent outer edge of the front plate 302. According to another embodiment (not shown), the interval between the outer edge of the display 301 and the outer edge of the front plate 302 may remain substantially even to maximize the active area of the display 301.

According to another embodiment (not shown), the screen display area (e.g., the active area), or an area (e.g., the inactive area) off the screen display area, of the display 301 may have a recess or opening in a portion thereof, and at least one or more of the audio module 314 (e.g., the audio module 170 of FIG. 1), sensor module 304 (e.g., the sensor module 176 of FIG. 1), camera module 305, and light emitting device 306 may be aligned with the recess or opening. According to another embodiment (not shown), at least one or more of the audio module 314, sensor module 304, camera module 305, fingerprint sensor 316, and light emitting device 306 may be included on the rear surface of the screen display area of the display 301. According to an embodiment (not shown), the display 301 may be disposed to be coupled with, or adjacent to, a touch detecting circuit, a pressure sensor capable of measuring the strength (pressure) of touches, and/or a digitizer for detecting a magnetic field-type stylus pen. According to an embodiment, at least part of the sensor modules 304 and 319 and/or at least part of the key input device 317 may be disposed in the first areas 310D and/or the second areas 310E.

The audio modules 303, 307, and 314 may include a microphone hole 303 and speaker holes 307 and 314. The microphone hole 303 may be aligned with a microphone to obtain sound. According to an embodiment, there may be a plurality of microphones so as to be able to detect the direction of the sound. The speaker holes 307 and 314 may include an external speaker hole 307 and a phone receiver hole 314. According to an embodiment, the speaker holes 307 and 314 and the microphone hole 303 may be implemented as a single hole, or speakers may be seated in the electronic device without the speaker holes 307 and 314 (e.g., piezo speakers).

The sensor modules 304, 316, and 319 may generate electrical signal or data value corresponding to internal operating states or external environmental states of the electronic device 300. The sensor modules 304, 316, and 319 may include a first sensor module 304 (e.g., proximity sensor) disposed on the first surface 310A of the housing 310, and/or a second sensor module (not shown) (e.g., fingerprint sensor), and/or a third sensor module 319 (e.g., heart-rate monitor (HRM) sensor) disposed on the second surface 310B of the housing 310, and/or a fourth sensor module 316 (e.g., fingerprint sensor). The fingerprint sensor may be disposed on the second surface 310B as well as the first surface 310A (e.g., the display 301) of the housing 310. The electronic device 300 may include another sensor module not shown, e.g., such as gesture sensor, gyro sensor, barometric sensor, magnetic sensor, acceleration sensor, grip sensor, color sensor, infrared (IR) sensor, biometric sensor, temperature sensor, humidity sensor, illuminance sensor, etc.

The camera modules 305, 312, and 313 may include a first camera device 305 disposed on the first surface 310A of the electronic device 300, and a second camera device 312 and/or a flash 313 disposed on the second surface 310B. The camera modules 305 and 312 may include one or more lenses, image sensor, and/or image signal processor. The flash 313 may be implemented as, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 300.

The key input device 317 may be disposed on the side surface 310C of the housing 310. According to an embodiment, the electronic device 300 may exclude all or some of the above-mentioned key input devices 317 and the excluded key input devices 317 may be implemented in other forms, e.g., as soft keys, on the display 301. According to an embodiment, the key input device may include the sensor module 316 disposed on the second surface 310B of the housing 310.

The light emitting device 306 may be disposed on, e.g., the first surface 310A of the housing 310. The light emitting device 306 may provide, e.g., information about the state of the electronic device 300 as a light signal (e.g. a flashing LED). According to an embodiment, the light emitting device 306 may also be a light source that interacts with, e.g., the camera module 305. The light emitting device 306 may be implemented as, e.g., a light emitting diode (LED), an infrared (IR) LED, or a xenon lamp.

The connector holes 308 and 309 may include a first connector hole 308 for receiving a connector (e.g., universal serial bus (USB) connector) for transmitting or receiving power and/or data to/from an external electronic device and/or a second connector hole 309 (e.g., earphone jack) for receiving a connector for transmitting or receiving audio signals to/from the external electronic device.

According to certain embodiments of the disclosure, the lens assembly (e.g., the lens assembly 400, 500, 600, or 700 of FIGS. 5, 7, 9, and/or 11) may include three or four lenses sequentially arranged along the optical axis, and the lenses may be referred to the 'first lens,' 'second lens,' 'third lens,' and/or 'fourth lens,' in order from the object whose image is to be captured to the image sensor. According to an embodiment, at least one of the lenses may include a coating layer (e.g., the coating layer C of FIG. 5) formed on the object-side surface or image sensor-side surface thereof. For example, the coating layer may be provided to the first lens (e.g., the third lens L3 of FIGS. 5 and 7 or the fourth lens L4 of FIGS. 9 and 11) on the side of the image sensor, and it should be noted that description of the coating layer is omitted from the descriptions of FIGS. 7 to 12 for the sake of brevity. According to certain embodiments, the coating layer may be provided on the object-side surface or image sensor-side surface of at least one of the lenses of the lens assembly. In an embodiment, the coating layer may at least partially block infrared light, e.g., light in the wavelength band of about 800 nm to 1000 nm, and may be configured to transmit visible light. In describing the configuration of each lens below, the image side may refer to the side toward the image plane img on which images are formed, and the object side may refer to the side toward the object obj whose image is to be captured. The "object side surface" of each lens is the lens surface toward the object with respect to the optical axis O and may refer to the surface on which light is incident with respect to the optical axis O. The "image side surface" is the lens surface toward the image plane img with respect to the optical axis O and may indicate the surface where light exits with respect to the optical axis O.

Conventionally, a camera or lens assembly may include an infrared blocking filter to prevent quality degradation of the captured image due to infrared light. Certain embodiments of the disclosure may block infrared light using a coating layer provided to any one of the lenses and may thus may not need the infrared blocking filter. For example, since there is no need for providing a space for the infrared blocking filter or a spatial interval between the infrared blocking filter and its adjacent optical element (e.g., lens(es) or the image sensor), the lens assembly may be miniaturized. When miniaturized, the lens assembly may be easily placed in the electronic device (e.g., the electronic device 101, 102, 104, or 300 of FIGS. 1 to 4) with a small placement space for the lens assembly, and it is possible to dispose multiple miniaturized lens assemblies in the electronic device. According to another embodiment, since the coating layer is able to substantially block light in the wavelength band of about 800 nm to 1000 nm, it is possible to obtain image quality at least equivalent to that of a lens assembly with an infrared blocking filter, even though it omits the infrared blocking filter.

According to certain embodiments of the disclosure, the lens assembly may be useful for miniaturizing electronic devices, such as laptop computers, tablet PCs, or smartphones, while providing the video call function. For example, a processor (e.g., the processor 120 of FIG. 1 or the image signal processor 260 of FIG. 2) may obtain a first image based on the light received or detected through the lens assembly, control the communication module (e.g., the communication module 190 of FIG. 1) to transmit the first image to an external device (e.g., the electronic device 102 or 104 or server 108 of FIG. 1) while communicating with the external device, and control a display (e.g., the display module 160 of FIG. 1 or the display 301 of FIG. 3) to display a second image received from the external device through the communication module. In an embodiment, if the communication with the external device is video call, the first image may be the user's image, and the second image may be the image transmitted by the other party to the call.

According to certain embodiments, as the lens assembly (e.g., the lens assembly 400, 500, 600, or 700 of FIGS. 5, 7, 9, and/or 11) is smaller and lightweight compared to conventional lens assemblies, it may be useful for wearable electronic devices (e.g., the electronic device 101, 102, or 104 as a goggles-type device) implementing object recognition, augmented reality, or virtual reality. For example, according to certain embodiments of the disclosure, the lens assembly may mitigate the user's fatigue when wearing the device while improving the wearable device's functionality. In some embodiments, the electronic device may obtain an image using the lens assembly in the direction of the user's gaze and transmit the obtained image to the external device (e.g., the electronic device 102 or 104 or server 108 of FIG. 1), requesting information regarding the image. In another embodiment, the electronic device or the processor (e.g., the processor 120 of FIG. 1) may receive information regarding the image from the external device and output it through the display (e.g., the display module 160 of FIG. 1, the display 301 of FIG. 3, or left/right eye lenses of the goggles-type electronic device).

Figure 5:
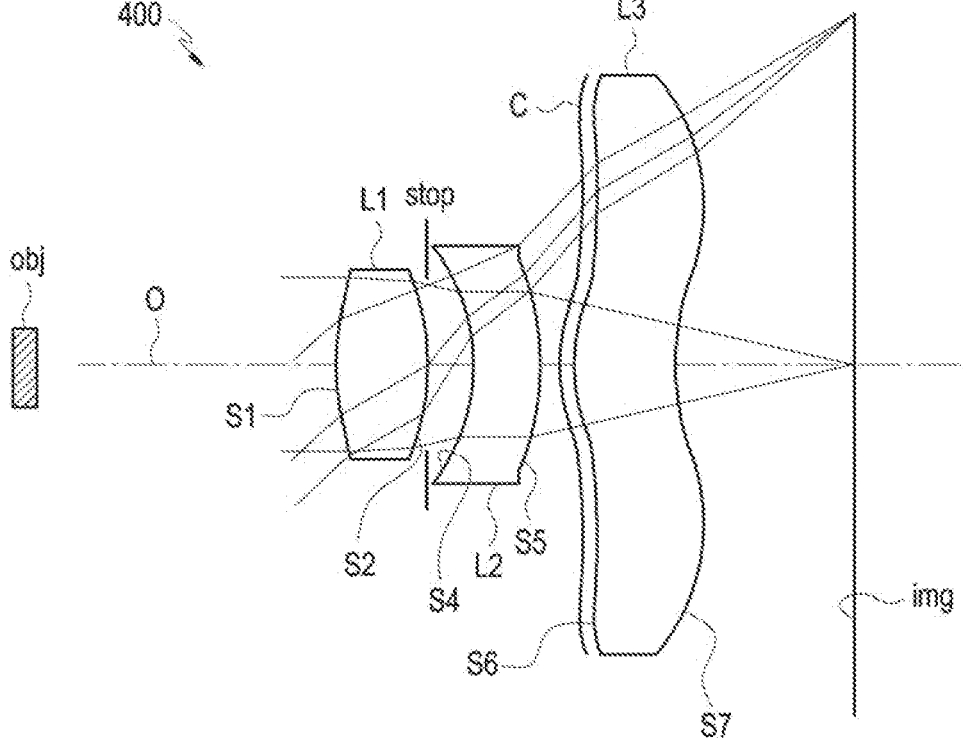
FIG. 5 is a view illustrating a configuration of a lens assembly according to one of various embodiments of the disclosure.
Figure 6:
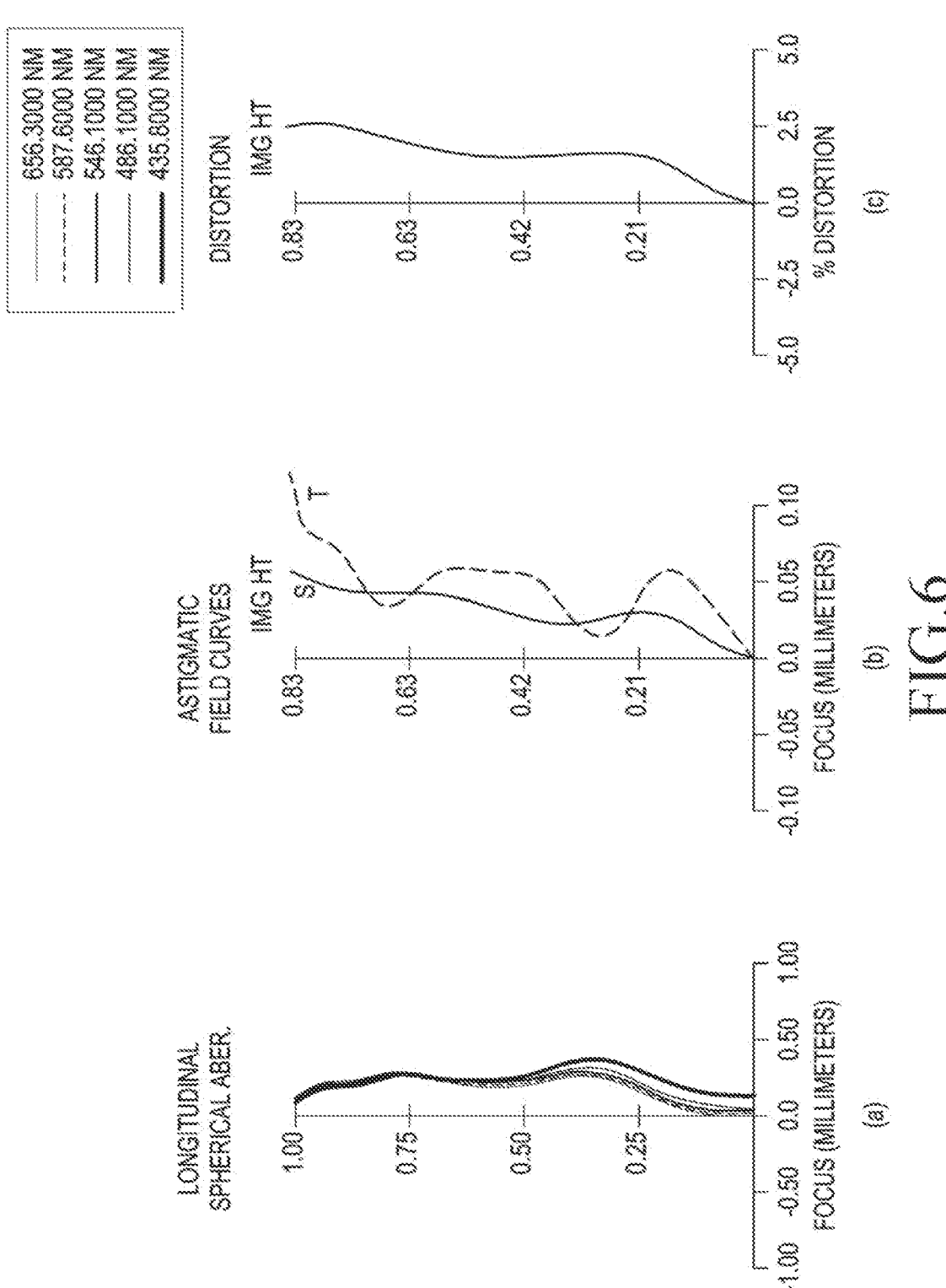
FIG. 6 is a graph illustrating the spherical aberration, astigmatism, and distortion of a lens assembly according to one of various embodiments of the disclosure.

FIG. 5 is a view illustrating a configuration of a lens assembly 400 according to one of various embodiments of the disclosure. FIG. 6 is a graph illustrating the spherical aberration, astigmatism, and distortion of a lens assembly 400 according to one of various embodiments of the disclosure.

(a) of FIG. 6 is a graph showing the spherical aberration of the lens assembly 400 according to one of various embodiments of the disclosure. The horizontal axis denotes the coefficient of the longitudinal spherical aberration, and the vertical axis denotes the normalized distance from the center of the optical axis. Variations in the longitudinal spherical aberration according to the wavelength of light are shown. The longitudinal spherical aberration is caused for light having, e.g., wavelength of 656.3000 (NM, nanometer) (e.g., red), 587.6000 (NM) (e.g., yellow), 546.1000 (NM), 486.1000 (NM) (e.g., blue), and 435.8000 (NM). (b) of FIG. 6 is a graph showing the astigmatic field curves of the lens assembly 400 according to one of various embodiments of the disclosure, in which shown are the results obtained at wavelength of 546.1000 nm. The dotted line denotes the astigmatism (e.g., meridional curvature) in the tangential (or meridional) direction, and the solid line denotes astigmatism (e.g., sagittal curvature) in the sagittal direction. In (b) of FIG. 6, the horizontal axis denotes the coefficient of astigmatism, and the vertical axis denotes the image height. (c) of FIG. 6 is a graph showing the distortion of the lens assembly 400 according to one of various embodiments of the disclosure, for light having wavelength of 546.1000 nm.

Referring to FIG. 5, the lens assembly 400 may include an image sensor (e.g., the image plane img), three lenses L1, L2, and L3 sequentially arranged along the optical axis O, and/or a coating layer C provided to the object (obj)-side surface or image sensor-side surface of any one of the lenses L1, L2, and L3. According to an embodiment, the image sensor or image plane img may be described as a separate component from the lens assembly 400. According to an embodiment, the coating layer C implements the function of an infrared blocking filter and may at least partially block light in the wavelength band of about 800 nm to about 1000 nm. In another embodiment the coating layer C may substantially block infrared light while substantially transmitting visible light, and the image sensor may receive or detect the visible light transmitted through the coating layer C while the light is focused or aligned by the lenses L1, L2, and L3. In some embodiments, the lens assembly 400 may implement any one of the camera modules 305, 312, and 313 of FIG. 3 or 4.

According to an embodiment, the coating layer C may be formed on the object-side surface S6 of the first lens from the image sensor, e.g., the third lens L3. In an embodiment, the light reflected by the coating layer C may be perceived as red by the user, and when the coating layer C is provided on a lens surface (e.g., the object-side surface S1 or S4 or the image sensor-side surface S2 or S5) of the first lens L1 or the second lens L2, the color of the light reflected by the coating layer C may be more clearly perceived by the user. The color of the light reflected by the coating layer C may negatively impact the external aesthetic appearance of the lens assembly 400 or the electronic device (e.g., the electronic device 101, 102, 104, or 300 of FIGS. 1 to 4). In certain embodiments of the disclosure, the coating layer C may be formed on the image sensor-side first lens (e.g., the third lens L3, or the fourth lens L4 of FIGS. 9 and 11) to prevent or mitigate such deterioration in the aesthetic appearance.

According to an embodiment, the surface on which the coating layer C is formed, e.g., the object-side surface S6 of the third lens L3, may have a small shape angle within about 20 degrees. The 'shape angle' may refer to the inclined angle between the image plane img or the plane substantially perpendicular to the optical axis O and one or more tangents to the lens surface. In the instant disclosure, when it is stated that the "shape angle is small," it may mean that the curvature in the coating layer C is small. According to an embodiment, when the coating layer C-formed surface (e.g., the object-side surface S6 of the third lens L3) is configured with a shape angle of about 20 degrees or less, it is possible to suppress wavelength shift of the light transmitted through the coating layer C or the third lens L3. In an embodiment, the coating layer C may be formed by depositing, painting, printing, or spraying the coating material on the lens surface and curing it, and as the lens surface is relatively flat as required by the above, the coating layer C may be formed in uniform thickness over the entire lens surface. For example, the lens(es) L1, L2, and L3 may be designed to have designated refractive power depending on the specifications required for the lens assembly 400 or the electronic device while at least one of the lens surfaces is designed to have a shape angle within about 20 degrees, so that the coating layer C may be formed in uniform thickness over the entire lens surface.

According to an embodiment, even without an infrared blocking filter, and the coating layer C provided to at least one of the lenses L1, L2, and L3 implements the function of the infrared blocking filter, the lens assembly 400 may meet the conditions of Equation 1 or 2 below.

$$0.001 \leq \frac{BFL}{HFoV} \leq 0.02 \qquad \text{[Equation 1]}$$

$$1.3 \leq \frac{OAL}{IH} \leq 1.6 \qquad \text{[Equation 2]}$$

Here, 'back focal length (BFL)' is the distance measured in 'mm' from the image sensor-side surface S7 of the image sensor (e.g., image plane img)-side first lens (e.g., the third lens L3) to the image plane img of the image sensor along the optical axis O, 'half field of view (HFoV)' is the half field of view of the lens assembly 400 and measured in degrees, 'overall length (OAL)' is the distance measured in 'mm' from the object-side surface S1 of the object (obj)-side first lens (e.g., the first lens L1) to the image plane img of the image sensor along the optical axis O, and 'image height (IH)' is the image height of the image sensor (e.g., the image plane img) measured in 'mm' from the optical axis O.

When the condition of Equation 1 is satisfied, the back focal length relative to the half field of view of the lens assembly 400 is reduced. For example, as the interval between the image sensor-side first lens (e.g., the third lens L3 or the fourth lens L4 of FIGS. 9 and 11) and the image sensor (e.g., the image plane img) is reduced, the lens assembly 400 may be miniaturized. According to the condition of Equation 2, if the overall length relative the image height is more than 1.6, the performance of the image sensor may be degraded or, due to the overall length, miniaturization may not be achieved. If it is less than 1.3, miniaturization is possible, but the performance of the lens assembly 400 may be degraded.

According to an embodiment, the plurality of lenses L1, L2, and L3 may include the first lens L1, the second lens L2, and/or the third lens L3 sequentially arranged along the optical axis O from the object obj to the image plane img. For example, the lenses L1, L2, and L3, along with the image sensor, may be aligned on the optical axis O, and at least one of the lens surfaces of the lenses L1, L2, and L3 may include an aspherical surface. In some embodiments, at least one of the lenses L1, L2, and L3 may be a plastic lens. According to an embodiment, in manufacturing the lens(es) L1, L2, and L3, glass facilitates miniaturization due to its high refractive index but lead to high manufacturing costs. In another embodiment, in manufacturing the lens(es) L1, L2, and L3, with plastic, it is somewhat difficult to secure high refractive indices as compared with glass, but it is easy to manufacture the lenses in the designed shapes and thus manufacturing costs are reduced. For example, an appropriate material for the lens(es) L1, L2, and L3 may be selected considering the specifications or manufacturing costs required for the electronic device. In some embodiments, at least one of the lenses L1, L2, and L3 may be a plastic aspherical lens, so that the lens assembly 400 may be small and lightweight. It may be easy to implement the optical performance required for the lens assembly 400 or the electronic device by combining aspherical lenses.

According to an embodiment, the object-side first lens, e.g., the first lens L1 may have the object-side surface S1 and the image sensor-side surface S2 that are convex and may have positive refractive power. As is described below, the first lens L1 (e.g., the first lens L1 of FIG. 9 or 11) may be a meniscus lens having the convex object-side surface S1. When the first lens L1 in the lens assembly 400 has positive refractive power, overall luminous flux is reduced, making it easy to miniaturize the lens assembly 400 and to reduce the f-number to 2.0 or less. According to an embodiment, when the first lens L1 is an aspherical lens, it may be easier to correct spherical aberration. As is described with reference to FIG. 7, the image sensor-side surface S2 of the first lens L1 may be provided with a stop of the lens assembly 400, that is, according to an embodiment, the stop may be disposed between the first lens L1 and the second lens L2. In another embodiment, when the first lens L1 is a meniscus lens, the first lens L1 may be further reduced in size, and distortion or astigmatism may be relatively easily corrected. In some embodiments, when the object-side second lens (e.g., the second lens L2) and the image sensor-side first lens (e.g., the third lens L3 or the fourth lens L4 of FIGS. 9 and 11) are configured to be symmetrical with each other, distortion or astigmatism may be may be relatively easily corrected. When the first lens L1 is configured as a plastic lens to reduce weight, the first lens L1 may have a refractive index of about 1.4 to 1.6.

According to an embodiment, the second lens from the object, e.g., the second lens L2, may be a meniscus lens with a convex image sensor-side surface S5 and may have negative refractive power. In some embodiments, the second lens L2 may be a plastic aspherical lens and may have a high refractive index of about 1.65 to 1.85. Such shape and/or refractive index of the second lens L2 may facilitate miniaturization of the lens assembly 400 and correction of aberration, and the difference in refractive index between the first lens L1 and the second lens L2 may facilitate correction of chromatic aberration in the lens assembly 400. When the lenses L1, L2, and L3 all are formed as plastic aspherical lenses, it may be possible to easily obtain the required optical performance while reducing size and weight.

According to an embodiment, a lens (e.g., the second lens L2) requiring high refractive index may be made of glass.

According to an embodiment, the third lens L3 may be a meniscus lens with a convex object-side surface S6 and may have positive refractive power. According to an embodiment, as mentioned above, the shape angle of the object-side surface S6 of the third lens L3 may be about 20 degrees or of about 0.883 mm, a f-number of about 2.08, a field of view of about 84.3 degrees, and/or an image height of about 0.835 nm and may meet at least one of Equations 1, 2, and 3 described above. According to certain embodiments of the disclosure, whether the lens assembly meets the conditions regarding the lens refractive index and/or Equations 1, 2, and 3 are described in more detail with reference to Table 13.

TABLE 1

| lens surface (surface) | surface type (surface type) | radius of curvature (y radius) | lens thickness or air gap (Thickness) | refractive index (Nd) | Abbe number (Vd) |
|---|---|---|---|---|---|
| S0 | Sphere | infinity | 500.000000 | | |
| S1 | Odd Polynomial | 0.61841 | 0.217032 | 1.544008 | 55.910586 |
| S2 | Odd Polynomial | −1.66941 | 0.000000 | | |
| stop | Sphere | infinity | 0.112359 | | |
| S4 | Odd Polynomial | −0.44344 | 0.160000 | 1.6803927 | 18.144 |
| S5 | Odd Polynomial | −2.54205 | 0.080859 | | |
| S6 | Odd Polynomial | 0.26704 | 0.245910 | 1.544008 | 55.910586 |
| S7 | Odd Polynomial | 0.43881 | 0.068818 | | |
| S8 | Sphere | infinity | 0.335049 | | |
| image | Sphere | infinity | 0.020000 | | | less, and the coating layer C may be provided on the object-side surface S6 of the third lens L3. In some embodiments, at least one of the object-side surface S6 and image sensor-side surface S7 of the third lens L3 may include an inflection point where the direction of curvature is reversed. As the third lens L3 is formed as a plastic aspherical lens, it is possible to meet the required optical performance while reducing the size and weight of the lens assembly 400.

According to an embodiment, when the image sensor (e.g., image plane img) has an image height of 1 mm or less while meeting Equation 3 below, the lens assembly 400 may be reduced in size and have good optical performance.

$$0.34 \leq \frac{\text{BFL}}{\text{f}} \leq 0.51 \qquad \text{[Equation 3]}$$

Here, 'f' is the focal length of the lens assembly 400 and may be in 'mm'. According to an embodiment, without an infrared blocking filter, the infrared blocking function is implemented by the coating layer C, and the distance between the third lens L3 and the image sensor (e.g., the image plane img) may be reduced. For example, as the lens assembly 400 is reduced in size, the ratio of the back focal length to the focal length may meet the condition of Equation 3, it is possible to provide good optical performance while including a miniaturized image sensor with an image height of 1 mm or less. When the ratio of the back focal length to the focal length is larger than 0.51, it means that the back focal length has increased and, in such a case, it may be hard to miniaturize the lens assembly 400. When the ratio of the back focal length to the focal length is smaller than 0.34, the lens assembly 400 may be further reduced in size, but the internal space may be overly small, rendering it difficult to have sufficient space for focusing or for the disposition of the lenses L1, L2, and L3 or the image sensor.

Table 1 below sets forth lens data of the lens assembly 400 of FIG. 5. 'S0' may mean the object obj, and 'stop' may mean the aperture of the stop. 'S1 to S2' and 'S4 to S7' may denote the lens surfaces of the related lenses L1, L2, and L3. In some embodiments, when the lens assembly 400 includes a cover glass disposed in front of or behind the array of the lenses L1, L2, and L3, 'S8' may refer to the surface of the cover glass. The lens assembly 400 may have a focal length Tables 2 and 3 below show the aspheric coefficients of the first to third lenses L1, L2, and L3, and the definition of aspherical surface may be obtained by Equation 4 as follows:

$$x = \frac{(y^2/R)}{1+\sqrt{(1-(1+K)(y/R)^2)}} + \sum (Ai)(y^i) \qquad \text{[Equation 4]}$$

Here, 'x' may mean the distance from the vertex of the lens in the direction of the optical axis, 'y' may mean the distance measured from the optical axis O along the direction perpendicular to the optical axis O, 'R' may mean the radius of curvature at the vertex of the lens, 'K' may mean the conic constant, and 'Ai' may mean the aspheric coefficient set forth in Tables 2 and 3.

TABLE 2

| | S1 | S2 | S4 |
|---|---|---|---|
| K | −2.200839E+00 | 3.352541E+01 | 7.262348E−01 |
| A4 | −7.408214E+00 | −2.740496E+01 | −2.217868E+01 |
| A6 | 3.273405E+03 | 1.026703E+04 | 2.747909E+03 |
| A8 | −9.561049E+05 | −2.755528E+06 | −3.678356E+05 |
| A10 | 1.607597E+08 | 4.527688E+08 | 3.469197E+07 |
| A12 | −1.711460E+10 | −4.878097E+10 | −2.195139E+09 |
| A14 | 1.224150E+12 | 3.600886E+12 | 9.550573E+10 |
| A16 | −6.097311E+13 | −1.871555E+14 | −2.903408E+12 |
| A18 | 2.155595E+15 | 6.949350E+15 | 6.211626E+13 |
| A20 | −5.440064E+16 | −1.849259E+17 | −9.316038E+14 |
| A22 | 9.727185E+17 | 3.494709E+18 | 9.618883E+15 |
| A24 | −1.202895E+19 | −4.573315E+19 | −6.577629E+16 |
| A26 | 9.778371E+19 | 3.936088E+20 | 2.762857E+17 |
| A28 | −4.698503E+20 | −2.002232E+21 | −6.082952E+17 |
| A30 | 1.010716E+21 | 4.557282E+21 | 4.520170E+17 |

TABLE 3

| | S5 | S6 | S7 |
|---|---|---|---|
| K | −7.346454E+01 | −6.749863E+00 | −2.917609E+00 |
| A4 | −2.872784E+01 | −4.028542E+00 | −3.835820E+00 |
| A6 | −2.162562E+03 | −4.991504E+01 | −2.295100E+01 |
| A8 | 4.770345E+05 | 1.086528E+03 | 6.074682E+02 |

TABLE 3-continued

|  | S5 | S6 | S7 |
|---|---|---|---|
| A10 | −4.431715E+07 | −8.764776E+03 | −6.054614E+03 |
| A12 | 2.586466E+09 | 3.886673E+04 | 4.017275E+04 |
| A14 | −1.031784E+11 | −9.861188E+04 | −2.051726E+05 |
| A16 | 2.914380E+12 | 1.339410E+05 | 8.483932E+05 |
| A18 | −5.919322E+13 | −7.557654E+04 | −2.777666E+06 |
| A20 | 8.665839E+14 | 0.000000E+00 | 6.772001E+06 |
| A22 | −9.053094E+15 | 0.000000E+00 | −1.149329E+07 |
| A24 | 6.575345E+16 | 0.000000E+00 | 1.260952E+07 |
| A26 | −3.151356E+17 | 0.000000E+00 | −7.967879E+06 |
| A28 | 8.951911E+17 | 0.000000E+00 | 2.192196E+06 |
| A30 | −1.140578E+18 | 0.000000E+00 | 0.000000E+00 |

Figure 7:
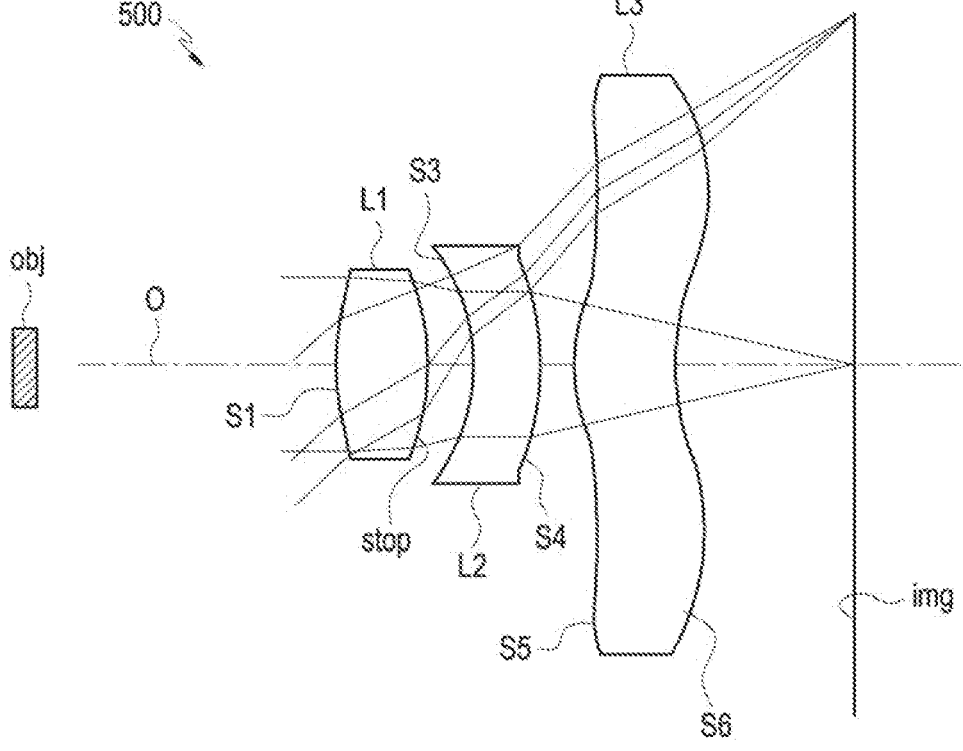
FIG. 7 is a view illustrating a configuration of a lens assembly according to another one of various embodiments of the disclosure.

According to an embodiment, as the lens assembly 400 implements the function of an infrared blocking filter using the coating layer C provided on the lens surface (e.g., the object-side surface S6) of the third lens L3, the distance between the third lens L3 and the image sensor (e.g., the of FIG. 5, and it will be appreciated by one of ordinary skill in the art that it can be applied to the lens assembly 500 of FIG. 7 in substantially the same manner.

Table 4 below sets forth the lens data of the lens assembly 500. 'S0' may denote the object obj, and 'stop' may denote the aperture of the stop. In the instant embodiment, the stop may be implemented substantially on the object-side surface (e.g., the surface denoted by 'S2' in FIG. 5) of the first lens L1. In Table 4 below, 'S1' and 'S3 to S6' may denote the surfaces of the related lenses L1, L2, and L3. In some embodiments, when the lens assembly 500 includes a cover glass disposed in front of or behind the array of the lenses L1, L2, and L3, 'S7' may refer to the surface of the cover glass. The lens assembly 500 may have a focal length of 0.75 mm, a f-number of 2.07, a field of view of 93.6 degrees, and an image height of 0.835 mm and may meet at least one of the conditions regarding refractive index and/or the above-described equations.

TABLE 4

| lens surface (surface) | surface type (surface type) | Radius of curvature (y radius) | lens thickness or air gap (Thickness) | refractive index (Nd)Nd | Abbe number (Vd)Vd |
|---|---|---|---|---|---|
| S0 | Sphere | infinity | 500.000000 |  |  |
| S1 | Odd Polynomial | 0.56324 | 0.208360 | 1.544008 | 55.910586 |
| stop | Odd Polynomial | −1.83364 | 0.066253 |  |  |
| S3 | Odd Polynomial | −0.61383 | 0.160000 | 1.6707332 | 19.229931 |
| S4 | Odd Polynomial | −1.28037 | 0.085771 |  |  |
| S5 | Odd Polynomial | 0.35768 | 0.268119 | 1.544008 | 55.910586 |
| S6 | Odd Polynomial | 0.44008 | 0.111485 |  |  |
| S7 | Sphere | infinity | 0.172005 |  |  |
| image | Sphere | infinity | 0.018000 |  |  | image plane img) may be easily reduced. For example, the lens assembly 400 may be implemented as a miniaturized lens assembly with an image height of 1 mm or less while being able to obtain captured images with quality at least equivalent to that of a lens assembly with an infrared blocking filter.

In the following description, descriptions of components that are the same or similar to those previously shown in FIGS. 1-6 may be omitted.

Figure 8:
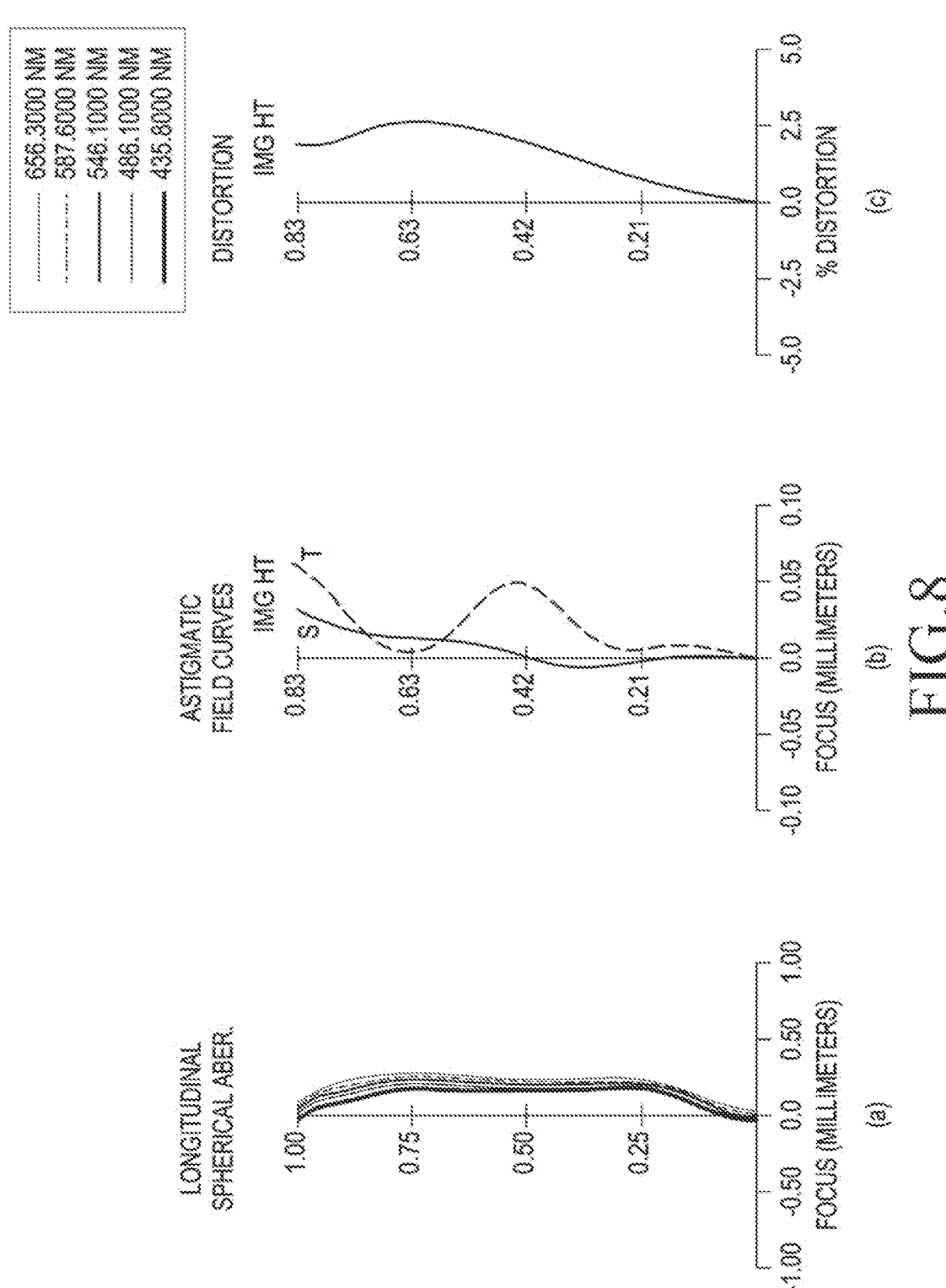
FIG. 8 is a graph illustrating the spherical aberration, astigmatism, and distortion of a lens assembly according to another one of various embodiments of the disclosure.

FIG. 7 is a view illustrating a configuration of a lens assembly 500 according to another one of various embodiments of the disclosure. FIG. 8 is a graph illustrating the spherical aberration, astigmatism, and distortion of a lens assembly 500 according to another one of various embodiments of the disclosure.

As compared with the lens assembly 400 of FIG. 5, the lens assembly 500 shown in FIGS. 7 and 8 may differ in that the stop is implemented substantially on the image sensor-side surface (e.g., the surface denoted by 'S2' in FIG. 5) of the first lens L1 and/or differ in some of the lens data. The lens assembly 500 may meet at least one of the conditions described above, such as conditions regarding the material, refractive power, or approximate shape of the lenses L1, L2, and L3, the configuration of implementing the function of an infrared blocking filter using a coating layer (e.g., the coating layer C of FIG. 5) provided to any one of the lenses L1, L2, and L3, the shape angle of the lens surface on which the coating layer C is formed, Equations 1, 2, and 3, and/or the refractive index of the first lens L1 and the second lens L2. Although not shown, the lens assembly 500 may exclude a separate infrared blocking filter by including a coating layer C to block infrared light. The configuration of the coating layer C has been described through the embodiment Tables 5 and 6 below show the aspheric coefficients of the first to third lenses L1, L2, and L3.

TABLE 5

|  | S1 | S2 | S3 |
|---|---|---|---|
| K | −2.392968E+00 | 5.596756E+01 | 1.300282E+00 |
| A4 | −5.524011E+00 | 5.036090E+00 | −2.811523E+01 |
| A6 | 2.216741E+03 | −4.700563E+03 | 5.000156E+03 |
| A8 | −6.284889E+05 | 9.335603E+05 | −7.991543E+05 |
| A10 | 9.800013E+07 | −1.208037E+08 | 8.370315E+07 |
| A12 | −9.652703E+09 | 1.098829E+10 | −5.746440E+09 |
| A14 | 6.483585E+11 | −7.196370E+11 | 2.664503E+11 |
| A16 | −3.107202E+13 | 3.413081E+13 | −8.524245E+12 |
| A18 | 1.089221E+15 | −1.170584E+15 | 1.908558E+14 |
| A20 | −2.816962E+16 | 2.884176E+16 | −3.007357E+15 |
| A22 | 5.334419E+17 | −5.033160E+17 | 3.315193E+16 |
| A24 | −7.201690E+18 | 6.052660E+18 | −2.500439E+17 |
| A26 | 6.560210E+19 | −4.760930E+19 | 1.228614E+18 |
| A28 | −3.607762E+20 | 2.201918E+20 | −3.541666E+18 |
| A30 | 9.028369E+20 | −4.536317E+20 | 4.541861E+18 |

TABLE 6

|  | S4 | S5 | S6 |
|---|---|---|---|
| K | −5.441271E+01 | −9.895461E+00 | −4.813247E+00 |
| A4 | −3.179401E+01 | −4.385222E+00 | 9.297498E−01 |
| A6 | 6.973508E+02 | −1.327809E+02 | −9.917107E+01 |
| A8 | 4.831468E+04 | 6.132735E+03 | 1.791596E+03 |
| A10 | −6.704427E+06 | −1.866074E+05 | −2.020028E+04 |
| A12 | 4.008966E+08 | 4.030440E+06 | 1.579851E+05 |
| A14 | −1.536018E+10 | −6.054535E+07 | −8.848283E+05 |
| A16 | 4.224727E+11 | 6.406322E+08 | 3.600402E+06 |
| A18 | −8.746797E+12 | −4.834730E+09 | −1.070111E+07 |
| A20 | 1.376580E+14 | 2.611007E+10 | 2.315268E+07 |

TABLE 6-continued

|  | S4 | S5 | S6 |
|---|---|---|---|
| A22 | −1.616220E+15 | −1.000282E+11 | −3.595294E+07 |
| A24 | 1.358025E+16 | 2.651307E+11 | 3.892001E+07 |
| A26 | −7.637677E+16 | −4.618104E+11 | −2.781195E+07 |
| A28 | 2.555122E+17 | 4.750485E+11 | 1.176481E+07 |
| A30 | −3.822724E+17 | −2.184749E+11 | −2.227085E+06 |

Figure 9:
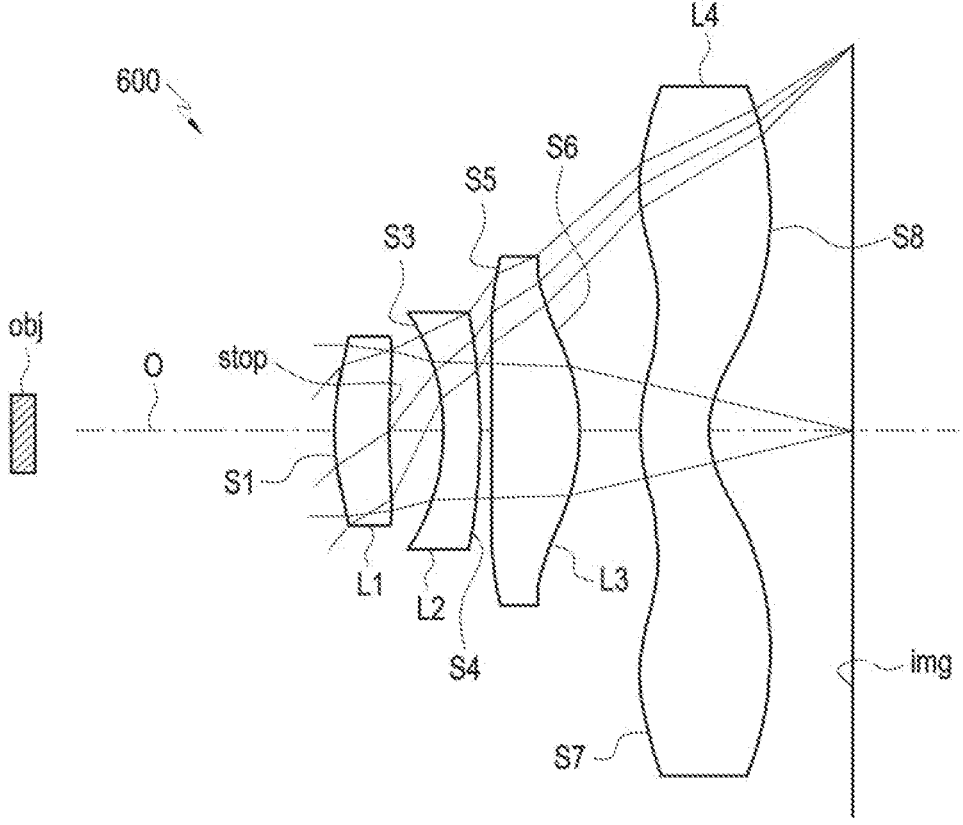
FIG. 9 is a view illustrating a configuration of a lens assembly according to still another one of various embodiments of the disclosure.
Figure 10:
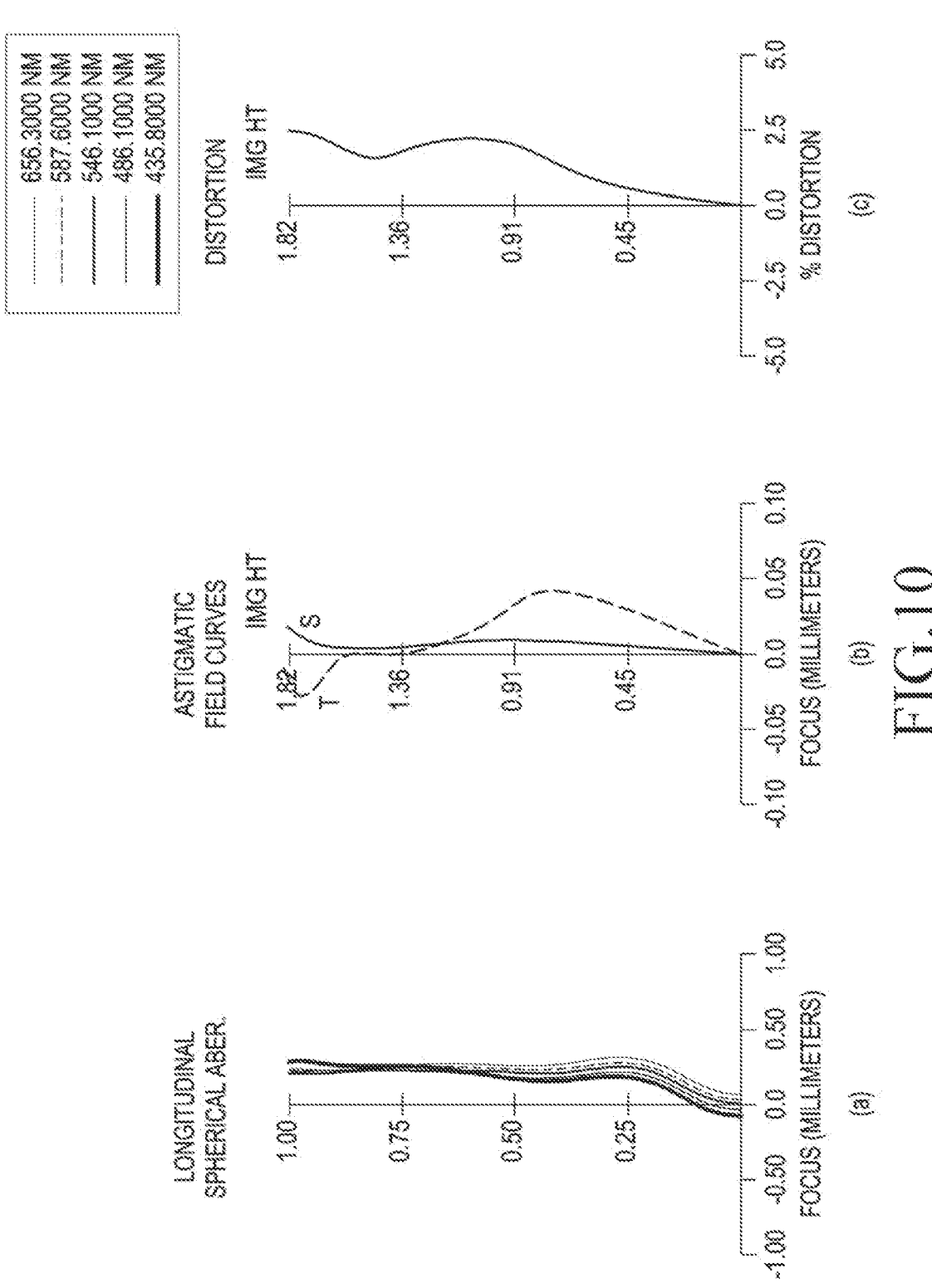
FIG. 10 is a graph illustrating the spherical aberration, astigmatism, and distortion of a lens assembly according to still another one of various embodiments of the disclosure.

FIG. 9 is a view illustrating a configuration of a lens assembly 600 according to another one of various embodiments of the disclosure. FIG. 10 is a graph illustrating the spherical aberration, astigmatism, and distortion of a lens assembly 600 according to another one of various embodiments of the disclosure.

Referring to FIGS. 9 and 10, a lens assembly 600 may include four lenses L1, L2, L3, and L4, and at least one of the four lenses L1, L2, L3, and L4 may be a plastic aspherical lens. When the lens assembly 600 includes the four lenses L1, L2, L3, and L4, a coating layer (e.g., the coating layer C of FIG. 5) may be formed on the object-side surface S7 (or the image sensor-side surface S8) of the image sensor-side first lens (e.g., the fourth lens L4), and the image sensor-side surface (e.g., the surface denoted by 'S2' in FIG. 5) of the first lens (e.g., the first lens L1) from the object side may be provided as a stop. According to an embodiment, the first lens L1 may have two opposite convex surfaces and have positive refractive power or may be a meniscus lens with a convex object-side surface S1 and have positive refractive power. Similar to the foregoing embodiment, the second lens L2, e.g., the second lens from the object side, may be a meniscus lens with a convex image sensor-side surface S4 and have negative refractive power. In some embodiments, the first lens L1 may have a refractive index of about 1.4 to 1.6, and the second lens L2 may have a high refractive index of about 1.65 to 1.85.

According to an embodiment, when the lens assembly 600 includes four lenses L1, L2, L3, and L4, the third lens (e.g., the third lens L3) from the object side may be a meniscus lens with a convex image sensor-side surface S6 and have positive refractive power. In some embodiments, the first lens from the image sensor side (or the fourth lens from the object side) (e.g., the fourth lens L4) may be a meniscus lens with a convex object-side surface S7 and have negative refractive power. In another embodiment, at least one of the object-side surface S7 and the image sensor-side surface S8 of the fourth lens L4 may include an inflection point. For example, at least one of the object-side surface S7 and the image sensor-side surface S8 of the fourth lens L4 may include a point where the direction of curvature is reversed between the center and the periphery. Although not shown, a coating layer (e.g., the coating layer C of FIG. 5) providing infrared blocking function may be provided on the object-side surface S7 (or image sensor-side surface S8) of the fourth lens L4, and the shape angle of the surface where the coating layer C is formed may be about 20 degrees or less.

According to an embodiment, when the lens assembly 600 includes an image sensor with an image height of 1 mm or more, it may have good optical performance by including at least four lenses L1, L2, L3, and L4. As compared with the foregoing embodiment, although the number of lenses L1, L2, L3, and L4 has increased, the lens assembly 600 may exclude an infrared blocking filter by implementing the infrared blocking function with the coating layer C. For example, although the number of lenses L1, L2, L3, and L4 has increased, it is possible to suppress an increase in the size of the lens assembly 600. Thus, the lens assembly 600 may be more easily disposed in compact electronic devices and multiple lens assemblies may be disposed in the electronic device.

Table 7 below sets forth the lens data of the lens assembly 600. 'S0' may denote the object obj, and 'stop' may denote the aperture of the stop. In the instant embodiment, the stop may be implemented substantially on the object-side surface (e.g., the surface denoted by 'S2' in FIG. 5) of the first lens L1. In Table 7 below, 'S1' and 'S3 to S8' may denote the surfaces of the related lenses L1, L2, L3, and L4. In some embodiments, when the lens assembly 600 includes a cover glass disposed in front of or behind the array of the lenses L1, L2, L3, and L4, 'S9' may refer to the surface of the cover glass. The lens assembly 600 may have a focal length of 1.74 mm, a f-number of 2.07, a field of view of 90.2 degrees, and an image height of 1.815 mm and may meet at least one of the conditions regarding refractive index and/or the above-described equations.

TABLE 7

| lens surface (surface) | surface type (surface type) | Radius of curvature (y radius) | lens thickness or air gap (Thickness) | refractive index (Nd) | Abbe number (Vd) |
|---|---|---|---|---|---|
| S0 | Sphere | infinity | 500.000000 | | |
| S1 | Odd Polynomial | 0.980414 | 0.277846 | 1.544008 | 55.910586 |
| stop | Odd Polynomial | 4.388866 | 0.256332 | | |
| S3 | Odd Polynomial | −2.010765 | 0.180000 | 1.6707332 | 19.229931 |
| S4 | Odd Polynomial | −8.415709 | 0.052828 | | |
| S5 | Odd Polynomial | −5.673812 | 0.419628 | 1.544008 | 55.910586 |
| S6 | Odd Polynomial | −1.026196 | 0.286698 | | |
| S7 | Odd Polynomial | 0.817854 | 0.355098 | 1.544008 | 55.910586 |
| S8 | Odd Polynomial | 0.548692 | 0.271571 | | |
| S9 | Sphere | infinity | 0.328680 | | |
| image | Sphere | infinity | 0.021323 | | |

Tables 8 and 9 below show the aspheric coefficients of the first to fourth lenses L1, L2, L3, and L4.

TABLE 8

|  | S1 | S2 | S3 | S4 |
|---|---|---|---|---|
| K | 1.709783E+00 | 7.946399E+00 | 8.402742E+00 | 5.393358E+01 |
| A4 | −8.516751E−01 | 6.394555E−02 | −1.218373E+00 | −4.620839E−01 |
| A6 | 2.688016E+01 | −4.147562E+01 | −2.517595E+00 | 3.553227E−01 |
| A8 | −7.331695E+02 | 2.004832E+03 | 1.714229E+02 | 3.057584E+01 |
| A10 | 1.133857E+04 | −5.957665E+04 | −5.838202E+03 | −1.811693E+03 |
| A12 | −1.091050E+05 | 1.141130E+06 | 1.066692E+05 | 2.982718E+04 |
| A14 | 6.593687E+05 | −1.478375E+07 | −1.188650E+06 | −2.704202E+05 |
| A16 | −2.442902E+06 | 1.332700E+08 | 8.660516E+06 | 1.591309E+06 |
| A18 | 5.077522E+06 | −8.488424E+08 | −4.258939E+07 | −6.454735E+06 |
| A20 | −4.543453E+06 | 3.835332E+09 | 1.434682E+08 | 1.848045E+07 |
| A22 | 0.000000E+00 | −1.219471E+10 | −3.312261E+08 | −3.739941E+07 |
| A24 | 0.000000E+00 | 2.664023E+10 | 5.150911E+08 | 5.243720E+07 |
| A26 | 0.000000E+00 | −3.802905E+10 | −5.156954E+08 | −4.848500E+07 |
| A28 | 0.000000E+00 | 3.192345E+10 | 3.002141E+08 | 2.658514E+07 |
| A30 | 0.000000E+00 | −1.194545E+10 | −7.723820E+07 | −6.543208E+06 |

TABLE 9

|  | S5 | S6 | S7 | S8 |
|---|---|---|---|---|
| K | −9.863650E+01 | −5.449964E+00 | −7.997213E+00 | −3.315884E+00 |
| A4 | 4.596477E−01 | −1.166434E+00 | −4.659708E−01 | −4.393676E−01 |
| A6 | 5.634956E+00 | 9.533223E+00 | 1.054422E−01 | 6.241829E−01 |
| A8 | −1.114038E+02 | −7.809098E+01 | −2.670867E−01 | −9.016755E−01 |
| A10 | 7.274558E+02 | 6.143300E+02 | 1.235229E+00 | 1.041793E+00 |
| A12 | −1.811653E+03 | −3.836274E+03 | −1.696393E+00 | −8.404136E−01 |
| A14 | −5.132773E+03 | 1.751681E+04 | 1.232225E+00 | 4.388055E−01 |
| A16 | 6.062859E+04 | −5.697642E+04 | −5.352497E−01 | −1.389311E−01 |
| A18 | −2.512416E+05 | 1.310652E+05 | 1.329121E−01 | 2.408772E−02 |
| A20 | 6.306291E+05 | −2.114968E+05 | −1.452098E−02 | −1.751950E−03 |
| A22 | −1.051743E+06 | 2.351164E+05 | 0.000000E+00 | 0.000000E+00 |
| A24 | 1.180541E+06 | −1.736404E+05 | 0.000000E+00 | 0.000000E+00 |
| A26 | −8.628649E+05 | 7.942488E+04 | 0.000000E+00 | 0.000000E+00 |
| A28 | 3.727927E+05 | −1.945255E+04 | 0.000000E+00 | 0.000000E+00 |
| A30 | −7.246903E+04 | 1.734577E+03 | 0.000000E+00 | 0.000000E+00 |

Figure 11:
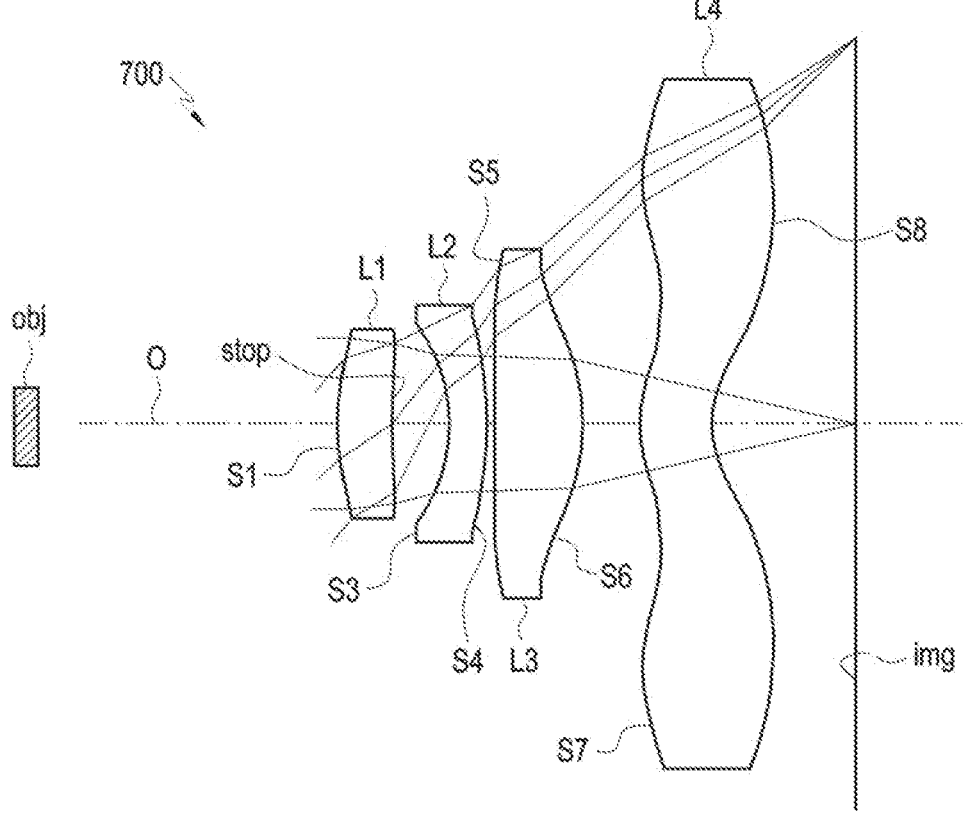
FIG. 11 is a view illustrating a configuration of a lens assembly according to still another one of various embodiments of the disclosure.
Figure 12:
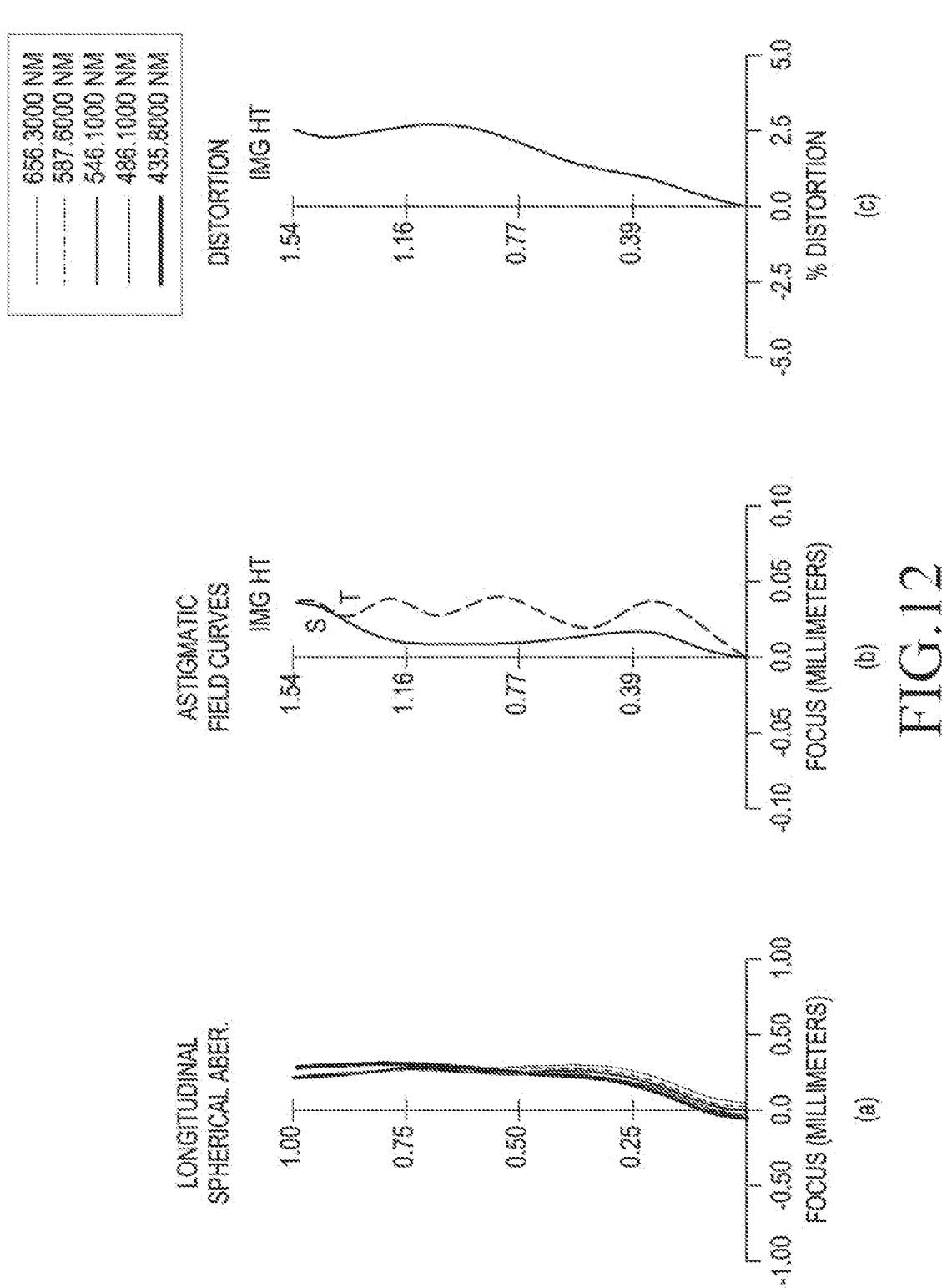
FIG. 12 is a graph illustrating the spherical aberration, astigmatism, and distortion of a lens assembly according to still another one of various embodiments of the disclosure.

FIG. 11 is a view illustrating a configuration of a lens assembly 700 according to still another one of various embodiments of the disclosure. FIG. 12 is a graph illustrating the spherical aberration, astigmatism, and distortion of a lens assembly 700 according to still another one of various embodiments of the disclosure.

The lens assembly 700 shown in FIGS. 11 and 12 may include lenses L1, L2, L3, and L4, a stop, and/or a coating layer (e.g., the coating layer C of FIG. 5) which are similar to those of the lens assembly 600 of FIG. 9. However the lens assembly 700 may differ from earlier embodiments in that it may have different lens data. In an embodiment, the lens assembly 700 may meet at least one of the conditions described above, such as conditions regarding the material, refractive power, or approximate shape of the lenses L1, L2, L3, and L4, the configuration of implementing the function of an infrared blocking filter using a coating layer (e.g., the coating layer C) provided to any one of the lenses L1, L2, L3, and L4, the shape angle of the lens surface on which the coating layer C is formed, Equations 1, 2, and 3, and/or the refractive index of the first lens L1 and the second lens L2.

Although not shown in FIG. 11, the lens assembly 700 may exclude a separate infrared blocking filter and instead include a coating layer C to block infrared light. The configuration of the coating layer C has been described through the embodiment of FIG. 5, and it will be appreciated by one of ordinary skill in the art that it is applied to the lens assembly 700 of FIG. 11 in substantially the same manner.

Table 11 below sets forth the lens data of the lens assembly 700. 'S0' may denote the object obj, and 'stop' may denote the aperture of the stop. In the instant embodiment, the stop may be implemented substantially on the object-side surface (e.g., the surface denoted by 'S2' in FIG. 5) of the first lens L1. In Table 11 below, 'S1' and 'S3 to S8' may denote the surfaces of the related lenses L1, L2, L3, and L4. In some embodiments, when the lens assembly 700 includes a cover glass disposed in front of or behind the array of the lenses L1, L2, L3, and L4, 'S9' may refer to the surface of the cover glass. The lens assembly 700 may have a focal length of 1.5 mm, a f-number of 2.07, a field of view of 89.0 degrees, and an image height of 1.542 mm and may meet at least one of the conditions regarding refractive index and/or the above-described equations.

TABLE 10

| lens surface (surface) | surface type (surface type) | Radius of curvature (y radius) | lens thickness or air gap (Thickness) | refractive index (Nd) | Abbe number (Vd) |
|---|---|---|---|---|---|
| S0 | Sphere | infinity | 500.000000 | | |
| S1 | Odd Polynomial | 0.840218 | 0.272122 | 1.544008 | 55.910586 |
| stop | Odd Polynomial | 5.414935 | 0.206532 | | |
| S3 | Odd Polynomial | −1.145519 | 0.180000 | 1.6707332 | 19.229931 |
| S4 | Odd Polynomial | −2.969051 | 0.025550 | | |
| S5 | Odd Polynomial | −6.434765 | 0.357252 | 1.544008 | 55.910586 |
| S6 | Odd Polynomial | −0.834031 | 0.245425 | | |
| S7 | Odd Polynomial | 0.637085 | 0.240087 | 1.544008 | 55.910586 |
| S8 | Odd Polynomial | 0.417937 | 0.223032 | | |
| S9 | Sphere | infinity | 0.325000 | | |
| image | Sphere | infinity | 0.025000 | | |

Tables 11 and 12 below show the aspheric coefficients of the first to fourth lenses L1, L2, L3, and L4.

TABLE 11

| | S1 | S2 | S3 | S4 |
|---|---|---|---|---|
| K | 1.641112E+00 | −6.649411E+01 | 3.405381E+00 | 3.405381E+00 |
| A4 | −9.501660E−01 | −2.382016E−01 | −1.674820E+00 | −1.674820E+00 |
| A6 | 1.756800E+01 | −6.200098E+01 | 4.161357E+00 | 4.161357E+00 |
| A8 | −4.513897E+02 | 4.785199E+03 | −2.325310E+02 | −2.325310E+02 |
| A10 | 6.192568E+03 | −2.229043E+05 | 5.129775E+03 | 5.129775E+03 |
| A12 | −5.314374E+04 | 6.535820E+06 | −4.054665E+04 | −4.054665E+04 |
| A14 | 2.718628E+05 | −1.277412E+08 | −2.472626E+05 | −2.472626E+05 |
| A16 | −7.818340E+05 | 1.721716E+09 | 9.067700E+06 | 9.067700E+06 |
| A18 | 1.071386E+06 | −1.629885E+10 | −9.711739E+07 | −9.711739E+07 |
| A20 | −4.787557E+05 | 1.089589E+11 | 5.870139E+08 | 5.870139E+08 |
| A22 | 0.000000E+00 | −5.105235E+11 | −2.233198E+09 | −2.233198E+09 |
| A24 | 0.000000E+00 | 1.637104E+12 | 5.464164E+09 | 5.464164E+09 |
| A26 | 0.000000E+00 | −3.417177E+12 | −8.369473E+09 | −8.369473E+09 |
| A28 | 0.000000E+00 | 4.178433E+12 | 7.319564E+09 | 7.319564E+09 |
| A30 | 0.000000E+00 | −2.269044E+12 | −2.794028E+09 | −2.794028E+09 |

TABLE 12

| | S5 | S6 | S7 | S8 |
|---|---|---|---|---|
| K | −9.887385E+01 | −7.658482E+00 | −9.588216E+00 | −3.618373E+00 |
| A4 | −9.683545E−01 | −2.617942E+00 | −6.889976E−01 | −8.800707E−01 |
| A6 | 1.001329E+02 | 4.478827E+01 | 1.905731E−01 | 2.954864E+00 |
| A8 | −2.475703E+03 | −7.010270E+02 | −6.230565E−01 | −1.040198E+01 |
| A10 | 3.395492E+04 | 9.064572E+03 | 3.965875E+00 | 2.672379E+01 |
| A12 | −3.071922E+05 | −8.559711E+04 | −7.001277E+00 | −4.667169E+01 |
| A14 | 1.954473E+06 | 5.726532E+05 | 6.367702E+00 | 5.559834E+01 |
| A16 | −8.950904E+06 | −2.724164E+06 | −3.343144E+00 | −4.618138E+01 |
| A18 | 2.959298E+07 | 9.290235E+06 | 8.558151E−01 | 2.822042E+01 |
| A20 | −6.971154E+07 | −2.275489E+07 | 1.714096E−01 | −1.441621E+01 |
| A22 | 1.131717E+08 | 3.967402E+07 | −3.772738E−01 | 7.131670E+00 |
| A24 | −1.180296E+08 | −4.804449E+07 | 3.056241E−01 | −3.221654E+00 |
| A26 | 6.674913E+07 | 3.840746E+07 | −1.527952E−01 | 1.063167E+00 |
| A28 | −9.026342E+06 | −1.822772E+07 | 4.197043E−02 | −2.072912E−01 |
| A30 | −6.083324E+06 | 3.890318E+06 | −4.766042E−03 | 1.750890E−02 |

According to certain embodiments, as set forth in Table 13 below, the lens assemblies 400, 500, 600, and 700 described above in connection with FIGS. 5 to 12 may meet the conditions of Equations 1 to 3 and/or conditions related to the refractive index of the lenses (e.g., the first lens L1 and the second lens L2).

TABLE 13

|  | embodiment of FIG. 5 | embodiment of FIG. 7 | embodiment of FIG. 9 | embodiment of FIG. 11 |
|---|---|---|---|---|
| Equation 1 | 0.01 | 0.006 | 0.013 | 0.012 |
| Equation 2 | 1.485 | 1.305 | 1.350 | 1.362 |
| Equation 3 | 0.508 | 0.361 | 0.342 | 0.372 |
| refractive index of first lens | 1.544 | 1.544 | 1.544 | 1.544 |
| refractive index of second lens | 1.680 | 1.670 | 1.670 | 1.670 |

As described above, according to an embodiment of the disclosure, a lens assembly (e.g., the lens assembly 400, 500, 600, or 700 of FIGS. 5, 7, 9, and/or 11) and/or an electronic device (e.g., the electronic device 101, 102, 104, or 300 of FIGS. 1 to 4) including the same may comprise an image sensor (e.g., the image plane img of FIGS. 5, 7, 9, and/or 11), three or four lenses (e.g., the lenses L1, L2, L3, and/or L4 of FIGS. 5, 7, 9, and/or 11) sequentially arranged along an optical axis (e.g., the optical axis O of FIGS. 5, 7, 9, and/or 11) from an object side to an image sensor side, and a coating layer (e.g., the coating layer C of FIG. 5) provided on an object-side surface or an image sensor-side surface of at least one of the lenses and configured to at least partially block light in a wavelength band of 800 nm to 1000 nm. The lens assembly may meet Equation 1 and Equation 2.

$$0.001 \le \frac{BFL}{HFoV} \le 0. \qquad \text{[Equation 1]}$$

$$1.3 \le \frac{OAL}{IH} \le 1. \qquad \text{[Equation 2]}$$

Here, 'BFL' may be a distance measured in 'mm' from an image sensor-side surface of an image sensor-side first lens (e.g., the third lens L3 of FIGS. 5 and 7 or the fourth lens L4 of FIGS. 9 and 11) to an image plane of the image sensor along the optical axis, 'half field of view (HFoV)' may be a half field of view, in 'degrees,' of the lens assembly, 'overall length (OAL)' may be a distance, in 'mm,' from an object-side surface of an object-side first lens (e.g., the first lens L1 of FIGS. 5, 7, 9, and/or 11) to the image plane of the image sensor along the optical axis, and 'image height (IH)' may be an image height of the image sensor measured in 'mm' from the optical axis.

According to an embodiment, the coating layer may be formed on the object-side surface of the image sensor-side first lens.

According to an embodiment, the object-side surface of the image sensor-side first lens may have a shape angle of 20 degrees or less with respect to image plane of the image sensor.

According to an embodiment, at least one of the lenses may be a plastic aspherical lens.

According to an embodiment, the lens assembly and/or the electronic device including the same may meet Equation 3.

$$0.34 \le \frac{BFL}{f} \le 0.51 \qquad \text{[Equation 3]}$$

Here, 'f' may be a focal length, in 'mm,' of the lens assembly.

According to an embodiment, the object-side first lens may have a convex object-side surface and a convex image sensor-side surface and have positive refractive power.

According to an embodiment, the object-side first lens may be a meniscus lens with a convex object-side surface.

According to an embodiment, the second lens (e.g., the second lens L2 of FIGS. 5, 7, 9, and/or 11) from the object side may be a meniscus lens with a convex image sensor-side surface.

According to an embodiment, the second lens from the object side may have negative refractive power.

According to an embodiment, the object-side first lens may have a refractive index of 1.4 to 1.6, inclusive.

According to an embodiment, the second lens from the object side may have a refractive index of 1.65 to 1.85, inclusive.

According to an embodiment, the image sensor-side first lens may include an inflection point on its object-side surface and/or its image sensor-side surface.

According to an embodiment, the lens assembly and/or the electronic device including the same may include the three lenses. The object-side first lens may have two opposite convex surfaces and have positive refractive power, a second lens may be a meniscus lens with a convex image sensor-side surface and have negative refractive power, and a third lens may be a meniscus lens with a convex object-side surface and have positive refractive power. The coating layer may be formed on the object-side surface of the third lens.

According to an embodiment, the lens assembly and/or the electronic device including the same may include the four lenses. The object-side first lens may have two opposite convex surfaces and have positive refractive power or be a meniscus lens with a convex object-side surface and have positive refractive power, a second lens may be a meniscus lens with a convex image sensor-side surface and have negative refractive power, a third lens may be a meniscus lens with a convex image sensor-side surface and have positive refractive power, and a fourth lens may be a meniscus lens with a convex object-side surface and have negative refractive power. The coating layer may be formed on the object-side surface of the fourth lens.

According to an embodiment of the disclosure, a lens assembly (e.g., the lens assembly 400, 500, 600, or 700 of FIGS. 5, 7, 9, and/or 11) and/or an electronic device (e.g., the electronic device 101, 102, 104, or 300 of FIGS. 1 to 4) including the same may comprise an image sensor (e.g., the image plane img of FIGS. 5, 7, 9, and/or 11), three or four lenses (e.g., the lenses L1, L2, L3, and/or L4 of FIGS. 5, 7, 9, and/or 11) sequentially arranged along an optical axis (e.g., the optical axis O of FIGS. 5, 7, 9, and/or 11) from an object side to an image sensor side, and a coating layer (e.g., the coating layer C of FIG. 5) formed on an object-side surface of an image sensor-side first lens (e.g., the third lens L3 of FIGS. 5 and 7 or the fourth lens L4 of FIGS. 9 and 11) and configured to at least partially block light in a wavelength band of 800 nm to 1000 nm. The object-side surface and/or an image sensor-side surface of the image sensor-side first lens may include an infection point. The lens assembly may meet Equation 4 and Equation 5.

$$0.001 \leq \frac{BFL}{HFoV} \leq 0.02 \qquad \text{[Equation 4]}$$

$$1.3 \leq \frac{OAL}{IH} \leq 1.6 \qquad \text{[Equation 5]}$$

Here, 'BFL' may be a distance measured in 'mm' from the image sensor-side surface of the image sensor-side first lens to an image plane of the image sensor along the optical axis, 'HFoV' may be a half field of view, in 'degrees,' of the lens assembly, 'OAL' may be a distance, in 'mm,' from an object-side surface of an object-side first lens (e.g., the first lens L1 of FIGS. 5, 7, 9, and/or 11) to the image plane of the image sensor along the optical axis, and 'IH' may be an image height of the image sensor measured in 'mm' from the optical axis.

According to an embodiment, the object-side surface of an image sensor-side first lens may have a shape angle of 20 degrees or less with respect to image plane of the image sensor.

According to an embodiment, the lens assembly and/or the electronic device including the same may include the three lenses. The object-side first lens may have two opposite convex surfaces and have positive refractive power, a second lens may be a meniscus lens with a convex image sensor-side surface and have negative refractive power, and a third lens may be a meniscus lens with a convex object-side surface and have positive refractive power. The coating layer may be formed on the object-side surface of the third lens.

According to an embodiment, the lens assembly and/or the electronic device including the same may include the four lenses. The object-side first lens may have two opposite convex surfaces and have positive refractive power or be a meniscus lens with a convex object-side surface and have positive refractive power, a second lens may be a meniscus lens with a convex image sensor-side surface and have negative refractive power, a third lens may be a meniscus lens with a convex image sensor-side surface and have positive refractive power, and a fourth lens may be a meniscus lens with a convex object-side surface and have negative refractive power. The coating layer may be formed on the object-side surface of the fourth lens.

According to an embodiment of the disclosure, an electronic device (e.g., the electronic device 101, 102, 104, or 300 of FIGS. 1 to 4) may comprise a housing (e.g., the housing 310 of FIG. 3), a display (e.g., the display 301 of FIG. 3) exposed through one surface of the housing, a lens assembly (e.g., the camera module 180, 280, 305, 312, or 313 of FIGS. 1 to 4 or the lens assembly 400, 500, 600, or 700 of FIGS. 5, 7, 9, and/or 11) received in the housing and configured to at least partially receive or detect light transmitted through the housing, according to any one of the above-described embodiments, a communication module (e.g., the communication module 190 of FIG. 1), and a processor (e.g., the processor 120 of FIG. 1). The processor may be configured to obtain a first image based on the light received or detected by the lens assembly, control the communication module to transmit the first image to an external device (e.g., the electronic device 102 or 104 or the server 108 of FIG. 1) in a communication session with the external device, and control the display to display a second image received from the external device through the communication module in the communication session with the external device.

According to an embodiment, the communication session may be a video call.

While the disclosure has been described and shown in connection with various embodiments, it should be appreciated that various embodiments are intended as limiting the invention but as illustrative. It will be apparent to one of ordinary skill in the art that various changes may be made in form and detail without departing from the overall scope of the disclosure, including the appended claims and their equivalents.

What is claimed is:
1. A lens assembly comprising:
an image sensor;
three or four lenses sequentially arranged along an optical axis from an object side to an image sensor side; and
a coating layer provided on an object-side surface or an image sensor-side surface of at least one of the three or four lenses and configured to at least partially block light in a wavelength band of 800 nm to 1000 nm,
wherein the lens assembly meets Equation 1 and Equation 2,

$$0.001 \leq \frac{BFL}{HFoV} \leq 0.02 \qquad \text{[Equation 1]}$$

$$1.3 \leq \frac{OAL}{IH} \leq 1.6 \qquad \text{[Equation 2]}$$

wherein 'back focal length (BFL)' is a distance from an image sensor-side surface of an image sensor-side first lens to an image plane of the image sensor along the optical axis, 'half field of view (HFoV)' is a half field of view of the lens assembly, 'overall length (OAL)' is a distance from an object-side surface of an object-side first lens to the image plane of the image sensor along the optical axis, and 'image height (IH)' is an image height of the image sensor from the optical axis,
wherein the lens assembly meets Equation 3, $$0.34 \leq \frac{BFL}{f} \leq 0.51 \qquad \text{[Equation 3]}$$

wherein 'f' is a focal length of the lens assembly.
2. The lens assembly of claim 1,
wherein the coating layer is provided on an object-side surface of an image sensor-side first lens of the three or four lenses, and the object-side surface of the image sensor-side first lens includes an inflection point.
3. The lens assembly of claim 2, wherein the object-side surface of the image sensor-side first lens has a shape angle of 20 degrees or less with respect to image plane of the image sensor.
4. The lens assembly of claim 2, wherein at least one of the three or four lenses is a plastic aspherical lens.
5. The lens assembly of claim 2, wherein the object-side first lens has a convex object-side surface and a convex image sensor-side surface and has positive refractive power.
6. The lens assembly of claim 2, wherein the object-side first lens is a meniscus lens with a convex object-side surface.

7. The lens assembly of claim 2, wherein a second lens from the object side is a meniscus lens with a convex image sensor-side surface.

8. The lens assembly of claim 7, wherein the second lens from the object side has negative refractive power.

9. The lens assembly of claim 2, wherein the object-side first lens has a refractive index of 1.4 to 1.6, inclusive.

10. The lens assembly of claim 2, wherein a second lens from the object side has a refractive index of 1.65 to 1.85, inclusive.

11. The lens assembly of claim 2, wherein the image sensor-side first lens includes an inflection point on its object-side surface and/or its image sensor-side surface.

12. The lens assembly of claim 2, wherein the lens assembly includes three lenses, wherein the object-side first lens has two opposite convex surfaces and has positive refractive power, a second lens is a meniscus lens with a convex image sensor-side surface and has negative refractive power, and a third lens is a meniscus lens with a convex object-side surface and has positive refractive power, and wherein the coating layer is formed on the object-side surface of the third lens.

13. The lens assembly of claim 2, wherein the lens assembly includes four lenses, wherein the object-side first lens has two opposite convex surfaces and has positive refractive power or is a meniscus lens with a convex object-side surface and has positive refractive power, a second lens is a meniscus lens with a convex image sensor-side surface and has negative refractive power, a third lens is a meniscus lens with a convex image sensor-side surface and has positive refractive power, and a fourth lens is a meniscus lens with a convex object-side surface and has negative refractive power, and wherein the coating layer is formed on the object-side surface of the fourth lens.

14. An electronic device comprising:

a housing;

a display exposed through one surface of the housing;

the lens assembly of claim 2, the lens assembly received in the housing and configured to at least partially receive or detect light transmitted through the housing;

a communication module; and a processor, wherein the processor is configured to, obtain a first image based on the light received or detected by the lens assembly, control the communication module to transmit the first image to an external device in a communication session with the external device, and control the display to display a second image received from the external device through the communication module in the communication session with the external device.

15. The electronic device of claim 14, wherein the communication session is a video call.

* * * * *